(12) United States Patent
Nepveu et al.

(10) Patent No.: US 12,260,493 B2
(45) Date of Patent: Mar. 25, 2025

(54) METHOD AND DEVICE FOR MULTI-CAMERA HOLE FILLING

(71) Applicant: Apple Inc., Cupertino, CA (US)

(72) Inventors: Bertrand Nepveu, Montreal (CA); Vincent Chapdelaine-Couture, Carignan (CA); Emmanuel Piuze-Phaneuf, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 212 days.

(21) Appl. No.: 18/089,664

(22) Filed: Dec. 28, 2022

(65) Prior Publication Data

US 2023/0377249 A1 Nov. 23, 2023

Related U.S. Application Data

(63) Continuation of application No. PCT/US2021/036321, filed on Jun. 8, 2021.
(Continued)

(51) Int. Cl.
*G06T 15/20* (2011.01)
*G06T 3/18* (2024.01)
(Continued)

(52) U.S. Cl.
CPC .............. *G06T 15/205* (2013.01); *G06T 3/18* (2024.01); *G06T 5/70* (2024.01); *G06T 7/50* (2017.01);
(Continued)

(58) Field of Classification Search
CPC ......... G06T 15/205; G06T 2207/10024; G06T 2207/10028; G06T 3/18; G06T 5/70; G06T 7/50; G06T 7/70
See application file for complete search history.

(56) References Cited

U.S. PATENT DOCUMENTS 5,122,825 A * 6/1992 Tokumaru .............. G02B 7/102
396/78
10,489,966 B2 11/2019 Nourai et al.
(Continued)

FOREIGN PATENT DOCUMENTS

WO 2020010018 A1 1/2020

OTHER PUBLICATIONS

PCT International Search Report and Written Opinion dated Sep. 27, 2021, PCT International Application No. PCT/US2023/036321, pp. 1-15.
(Continued)

*Primary Examiner* — Sing-Wai Wu
(74) *Attorney, Agent, or Firm* — Fernando & Partners, LLP

(57) ABSTRACT

The method includes: obtaining a first image of an environment from a first image sensor associated with first intrinsic parameters; performing a warping operation on the first image according to perspective offset values to generate a warped first image in order to account for perspective differences between the first image sensor and a user of the electronic device; determining an occlusion mask based on the warped first image that includes a plurality of holes; obtaining a second image of the environment from a second image sensor associated with second intrinsic parameters; normalizing the second image based on a difference between the first and second intrinsic parameters to produce a normalized second image; and filling a first set of one or more holes of the occlusion mask based on the normalized second image to produce a modified first image.

26 Claims, 14 Drawing Sheets

Related U.S. Application Data

(60) Provisional application No. 63/045,394, filed on Jun. 29, 2020.

(51) Int. Cl.
*G06T 5/70* (2024.01)
*G06T 7/50* (2017.01)
*G06T 7/70* (2017.01)

(52) U.S. Cl.
CPC ...... *G06T 7/70* (2017.01); *G06T 2207/10024* (2013.01); *G06T 2207/10028* (2013.01)

(56) References Cited

U.S. PATENT DOCUMENTS

| | | | |
|---|---|---|---|
| 10,545,717 B2 | 1/2020 | Harviainen | |
| 10,565,779 B2 | 2/2020 | Lo et al. | |
| 2014/0098194 A1* | 4/2014 | Goma | H04N 13/25 348/47 |
| 2019/0304164 A1* | 10/2019 | Zhang | G06T 1/20 |

OTHER PUBLICATIONS

Mashhour Solh et al., "Hierarchical hole-filling for depth-based view synthesis in FTV and 3D video." IEEE Journal of Selected Topics in Signal Processing 6.5 (2012): 495-504.

Oliver Bimber et al., "Alternative Augmented Reality Approaches: Concepts, Techniques, and Applications." Eurographics (Tutorials). 2003.

Chun-Jui Lai et al., "Exploring Manipulation Behavior on Video See-Through Head-Mounted Display with View Interpolation," Computer Vision—ACCV 2016 Workshops: ACCV 2016 International Workshops, Taipei, Taiwan, Nov. 20-24, 2016, Revised Selected Papers, Part III 13. Springer International Publishing, 2017.

Extended European Search Report dated Nov. 24, 2023, European Application No. 23172550.8, pp. 1-12.

Preliminary Rejection for corresponding Korean Appl. No. 10-2023-7003218 mailed Aug. 5, 2024, 6 pages.

Walton, David R., et al. Accurate real-time occlusion for mixed reality, VRST '17: Proceedings of the 23rd ACM Symposium on Virtual Reality Software and Technology, Nov. 8-10, 2017 (Nov. 8, 2017).

\* cited by examiner

METHOD AND DEVICE FOR MULTI-CAMERA HOLE FILLING

CROSS-REFERENCE TO RELATED APPLICATIONS

This application is a continuation of Intl. Patent App. No. PCT/US2021/036321, filed on Jun. 8, 2021, which claims priority to U.S. Provisional Patent App. No. 63/045,394, filed on Jun. 29, 2020, which are both hereby incorporated by reference in their entirety.

TECHNICAL FIELD

The present disclosure generally relates to hole filling, and in particular, to systems, methods, and devices for multi-camera hole filling.

BACKGROUND

The points of view (POVs) of a forward-facing image sensor of a near-eye system and a user of the near-eye system are different. For example, the forward-facing image sensor may be closer to the physical environment than the user's POV and may also be offset from the position of the user's eyes (e.g., translated vertically and/or horizontally). To account for this difference in POV, the images from the forward-facing image sensor may be warped in order to provide a more comfortable experience for the user and to fulfill user expectations regarding POV. However, this warping process may introduce holes (e.g., including occlusions and disocclusions) in the warped images.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
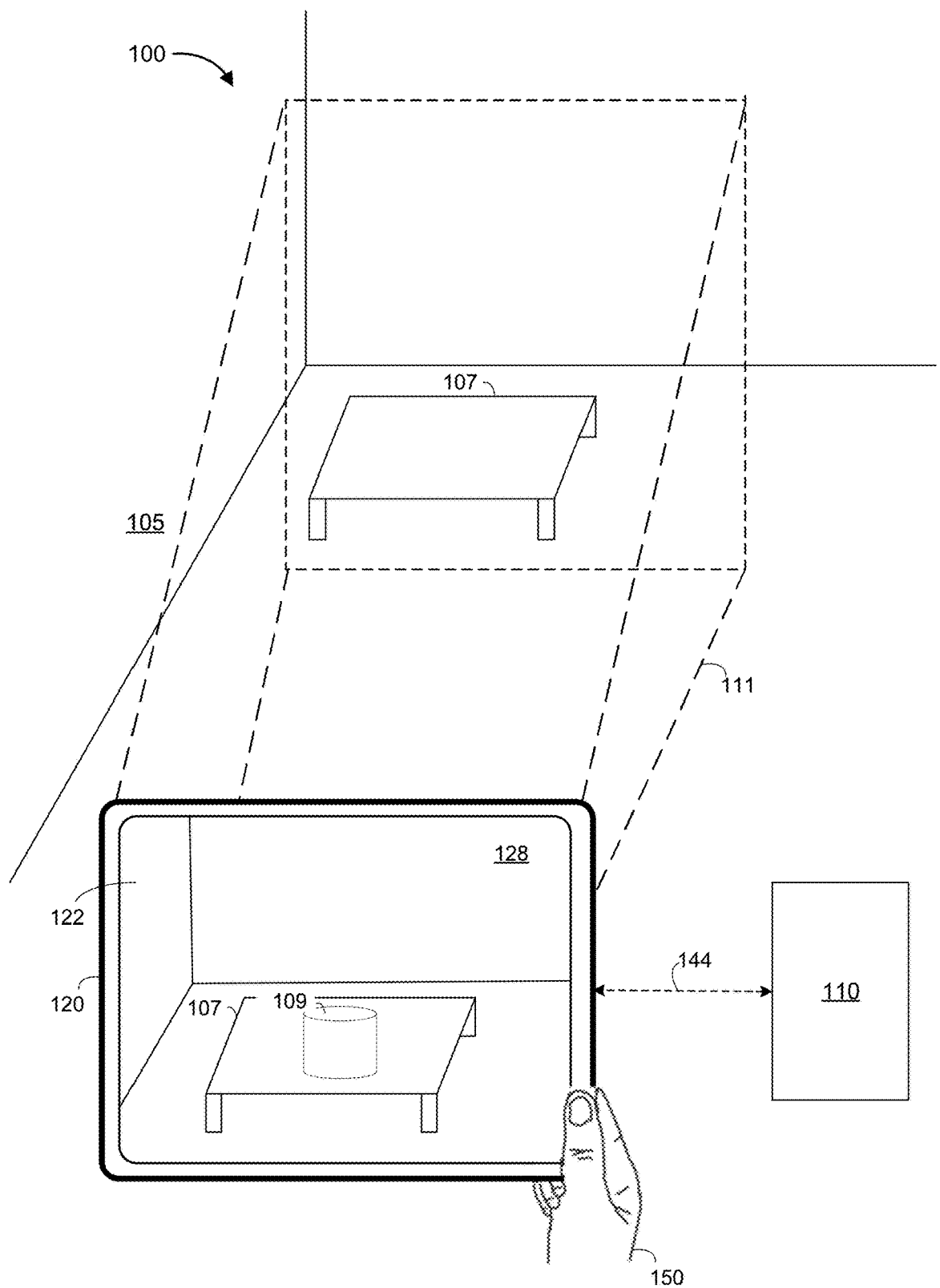
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for multi-camera hole filling, which results in an image that is a near representation of the user's field-of-view with a reduced number of holes (e.g., occlusions and disocclusions). According to some implementations, a method for multi-camera hole filling may obtain an occlusion mask based on a warped image of an environment captured by a respective image sensor, wherein the warped image accounts for the POV difference between a user's eye and the respective image sensor as mentioned above. In some implementations, the method for multi-camera hole filling may fill holes of the occlusion mask based on images from other image sensors different from the respective image sensor, wherein the aforementioned images are normalized to account for different intrinsic camera characteristics between the respective image sensor and the other image sensors. In some implementations, the method for multi-camera hole filling may also fill holes of the occlusion mask based on a diffusion and/or feathering process, wherein the diffusion and/or feathering process may be associated with a diffusion kernel that accounts for depth and/or displacement/distance.

According to some implementations, the method is performed at a computing system including non-transitory memory and one or more processors, wherein the computing system is communicatively coupled to a first image sensor and a second image sensor. The method includes: obtaining a first image of an environment from a first image sensor, wherein the first image sensor is associated with first intrinsic parameters; performing a warping operation on the first image according to perspective offset values to generate a warped first image in order to account for perspective differences between the first image sensor and a user of the electronic device; determining an occlusion mask based on the warped first image that includes a plurality of holes; obtaining a second image of the environment from a second image sensor, wherein the second image sensor is associated with second intrinsic parameters; normalizing the second image based on a difference between the first and second intrinsic parameters to produce a normalized second image; and filling a first set of one or more holes of the occlusion mask based on the normalized second image to produce a modified first image.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

In accordance with some implementations, a computing system includes one or more processors, non-transitory memory, an interface for communicating with a display device and one or more input devices (e.g., the first and second images sensors), and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices (e.g., the first and second images sensors), cause the computing system to perform or cause performance of the operations of any of the methods described herein. In accordance with some implementations, a computing system includes one or more processors, non-transitory memory, an interface for communicating with a display device and one or more input devices (e.g., the first and second images sensors), and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that someone may interact with and/or sense without the use of electronic devices. The physical environment may include physical features such as a physical object or physical surface. For example, a physical environment may include a physical city that includes physical buildings, physical streets, physical trees, and physical people. People may directly interact with and/or sense the physical environment through, for example, touch, sight, taste, hearing, and smell. An extended reality (XR) environment, on the other hand, refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, µLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and zero or more other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
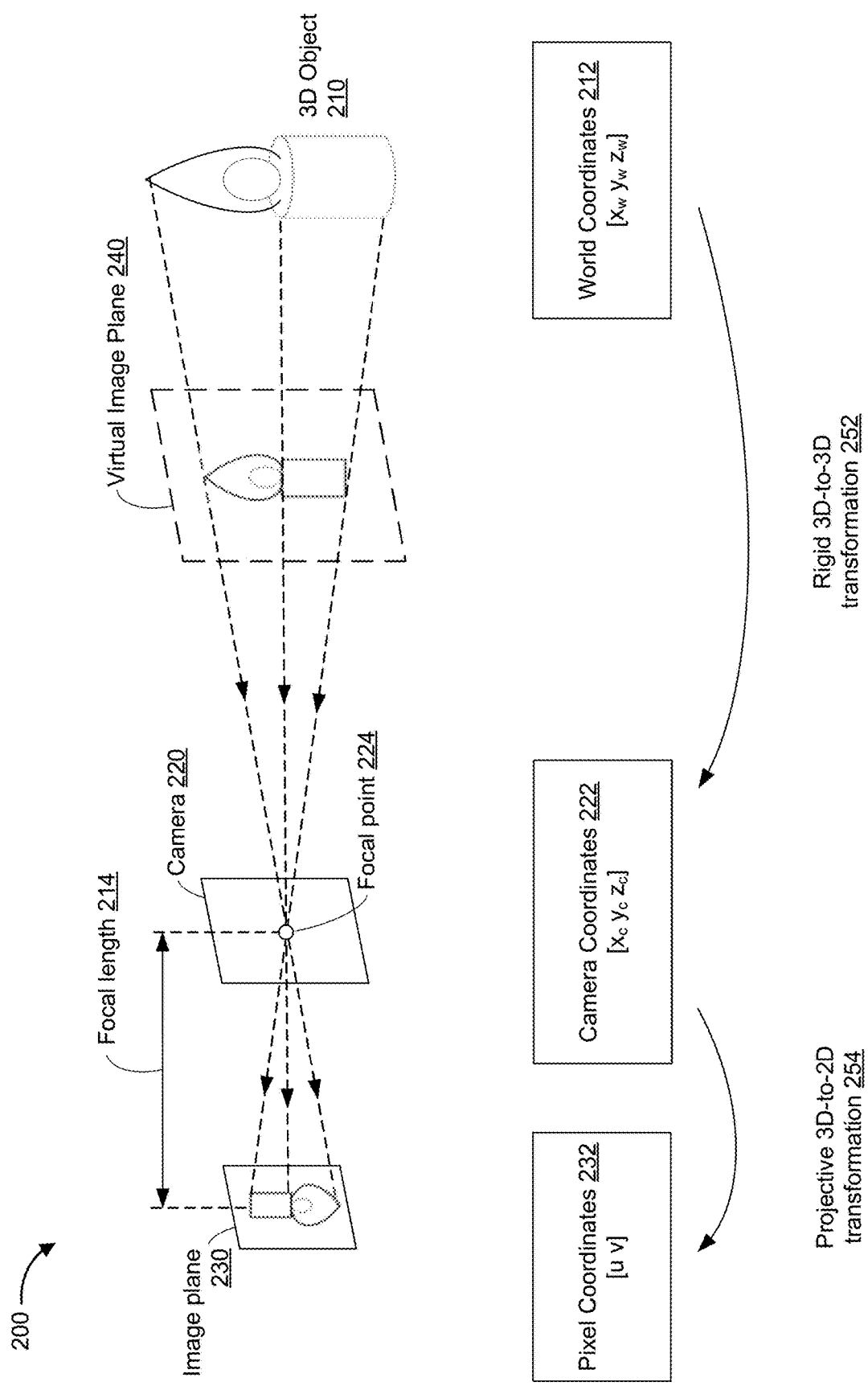
FIG. 2 is an illustrative diagram of an image capture architecture in accordance with some implementations.

FIG. 2 is an illustrative diagram of an image capture architecture 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the image capture architecture 200 includes a camera 220 that captures an image (e.g., relative to an image plane 230) that includes at least a 3D object 210 within an associated 3D world scene. For example, the camera 220 may be an image sensor implemented in the electronic device 120 with the field-of-view 111 of the physical environment 105, as discussed herein with respect to FIG. 1.

As shown in FIG. 2, the image capture architecture 200 includes the 3D object 210 in the 3D world scene (e.g., the physical environment 105 in FIG. 1). The 3D object is associated with 3D world coordinates 212: $[x_w \ y_w \ z_w]$. The image capture architecture 200 also includes a camera 220 (e.g., a pinhole camera or the like) with a focal point 224. The camera 220 is associated with 3D camera coordinates 222: $[x_c \ y_c \ z_c]$. The image capture architecture 200 further includes an image plane 230 separated from the focal point 224 of the camera 220 by a focal length 214. The image plane 230 (or features thereon) is associated with 2D pixel coordinates 232: $[u \ v]$.

According to some implementations, the camera 220 is a simple camera without a lens and with a single small aperture (e.g., the focal point 224). Light rays pass through the aperture and project an inverted image onto the image plane 230 on the opposite side of the camera 220. According to some implementations, a virtual image plane 240 is illustrated for ease of reference as being in front of the camera 220 with an upright image of the 3D world scene.

The camera parameters are represented by a camera matrix, which is shown below as equation (1). The camera matrix maps the 3D world scene into the image plane 230. The camera matrix includes both extrinsic and intrinsic parameters. The extrinsic parameters represent the location of the camera 220 in the 3D scene (e.g., the 3D camera coordinates 222). The intrinsic parameters represent the focal point 224 (e.g., the optical center or aperture) and the focal length 214 of the camera 220. In other words, the camera matrix is used to denote a projective mapping from the 3D world coordinates 212 to the 2D pixel coordinates 232.

$$z_c \begin{bmatrix} u \\ v \\ 1 \end{bmatrix} = K[R \ T] \begin{bmatrix} x_w \\ y_w \\ z_w \\ 1 \end{bmatrix} \quad (1)$$

$[u \ v \ 1]^t$ represents a 2D point in the 2D pixel coordinates 232, and $[x_w \ y_w \ z_w \ 1]^t$ represents a 3D point position in the 3D world coordinates 212, where the exponent t represents the transposition operator. Both are expressed in the augmented notation of homogeneous coordinates, which is the most common notation in robotics and rigid body transforms.

The intrinsic parameters are represented by the intrinsic matrix K, which is shown below as equation (2). The parameters $\alpha_x = f \cdot m_x$ and $\alpha_y = f \cdot m_y$ represent focal length in terms of pixels, where $m_x$ and $m_y$ are scale factors relating pixels to distance and f is the focal length 214 in terms of distance. $\gamma$ represents a skew coefficient between the x- and y-axis and is often 0. $u_0$ and $v_0$ represent the principal point.

$$K = \begin{bmatrix} \alpha_x & \gamma & u_0 & 0 \\ 0 & \alpha_y & v_0 & 0 \\ 0 & 0 & 1 & 0 \\ 0 & 0 & 0 & 1 \end{bmatrix} \quad (2)$$

The extrinsic parameters are represented by the extrinsic matrix [R T], which is shown below as equation (3). $R_{3\times3}$ is sometimes referred to as the rotation matrix, and Taxi is sometimes referred to as the translation vector. [R T] encompasses the extrinsic parameters, which denote coordinate system transformations from the 3D world coordinates 212 to the 3D camera coordinates 222. Equivalently, the extrinsic parameters define the position of the camera center and the camera's heading in the 3D world coordinates 212. T corresponds to the position of the origin of the world coordinate system expressed in coordinates of the camera-centered coordinate system.

$$[R \ T]_{4\times 4} = \begin{bmatrix} R_{3\times 3} & T_{3\times 1} \\ 0_{1\times 3} & 1 \end{bmatrix} \quad (3)$$

As such, according to some implementations, a rigid 3D-to-3D transformation 252 from the 3D world coordinates 212 to the 3D camera coordinates 222 (or vice versa) exists based on extrinsic parameters associated with three rotational degrees of freedom (DOFs) and three translational DOFs (e.g., the extrinsic matrix [R T]). According to some implementations, a projective 3D-to-2D transformation 254 from the set of camera coordinates 222 to the 2D pixel coordinates 232 (or vice versa) exists based on the intrinsic parameters associated with the camera 220 (e.g., the intrinsic matrix K). One of ordinary skill in the art will appreciate how the image capture architecture 200 in FIG. 2 and the explanation thereof may be adapted to the multi-camera architecture 300 described below with reference to FIG. 3A.

Figure 3A:
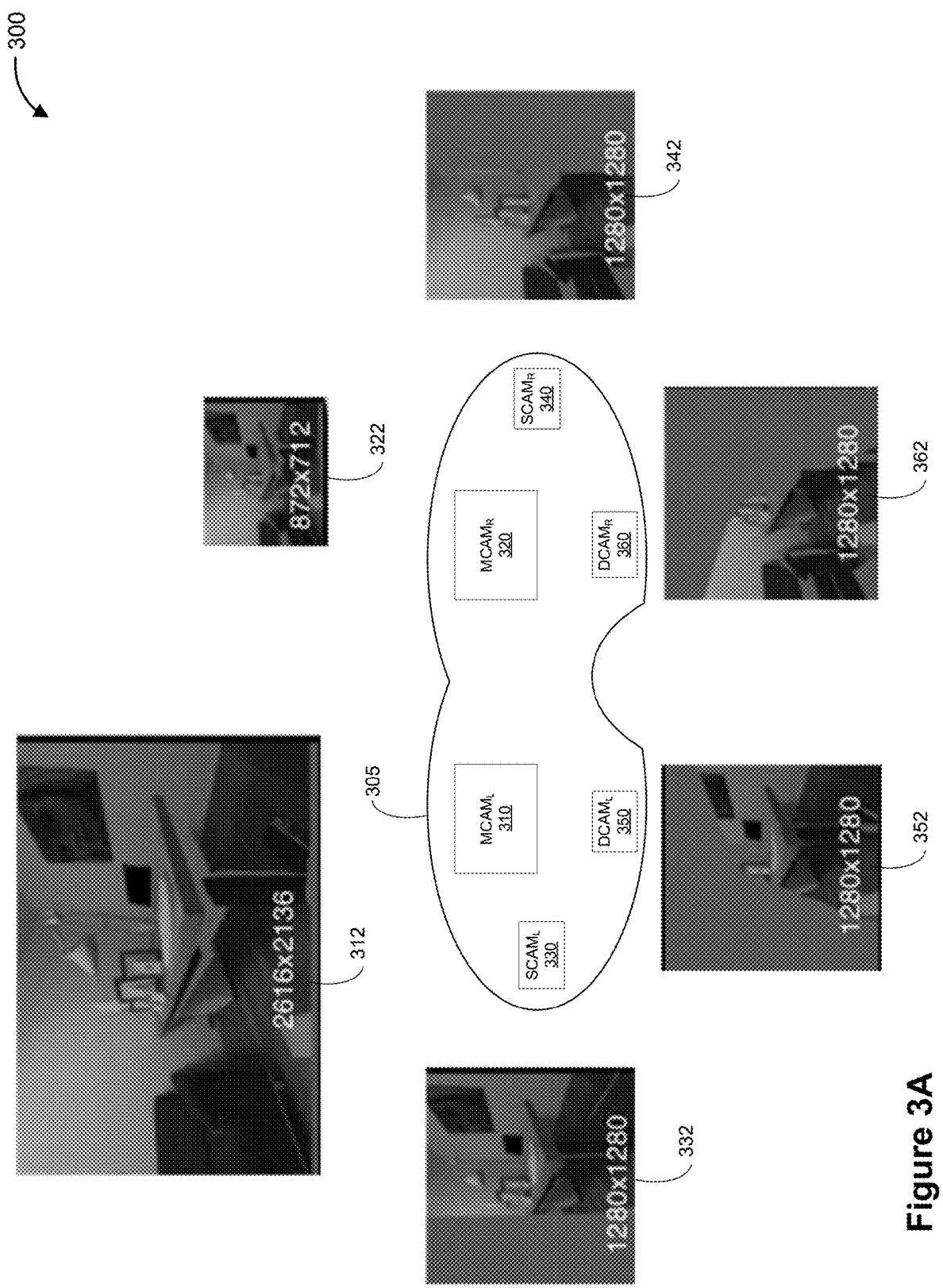
FIG. 3A is an illustrative diagram of a multi-camera architecture in accordance with some implementations.

FIG. 3A is an illustrative diagram of a multi-camera architecture 300 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the multi-camera architecture 300 corresponds to a near-eye system 305 with a plurality of image sensors including a left main (forward-facing) camera 310 (sometimes also referred to as "$MCAM_L$"), a right (forward-facing) main camera 320 (sometimes also referred to as "$MCAM_R$"), a left side-facing (peripheral) camera 330 (sometimes also referred to as "$SCAM_L$"), a right side-facing (peripheral) camera 340 (sometimes also referred to as "$SCAM_R$"), a left downward-facing camera 350 (sometimes also referred to as "$DCAM_L$"), and a right downward-facing camera 360 (sometimes also referred to as "$DCAM_R$"). As one example, the electronic device 120 in FIGS. 1 and 10 may correspond to the near-eye system 305.

As shown in FIG. 3A, each of the plurality of image sensors of the near-eye system 305 captures an image of an environment (e.g., a physical environment, a partially XR environment, a fully XR environment, and/or the like). In this example, the left main (forward-facing) camera 310 captures an image 312 of the environment according to its intrinsic parameters (e.g., 2616×2136 resolution), and the right main (forward-facing) camera 320 captures an image 322 of the environment according to its intrinsic parameters (e.g., 872×712 resolution).

Continuing with this example, the left side-facing camera 330 captures an image 332 of the environment according to its intrinsic parameters (e.g., 1280×1280 resolution), and the right side-facing camera 340 captures an image 342 of the environment according to its intrinsic parameters (e.g., 1280×1280 resolution). Furthermore, continuing with this example, the left downward-facing camera 350 captures an image 352 of the environment according to its intrinsic parameters (e.g., 1280×1280 resolution), and the right downward-facing camera 360 captures an image 362 of the environment according to its intrinsic parameters (e.g., 1280×1280 resolution). The intrinsic parameters for the plurality of image sensors of the near-eye system 305 are described below in more detail with reference to FIG. 3C. One of ordinary skill in the art will appreciate that the number and location of the image sensors of the near-eye system 305 in FIG. 3A is merely an example and may be different in other implementations.

Figure 3B:
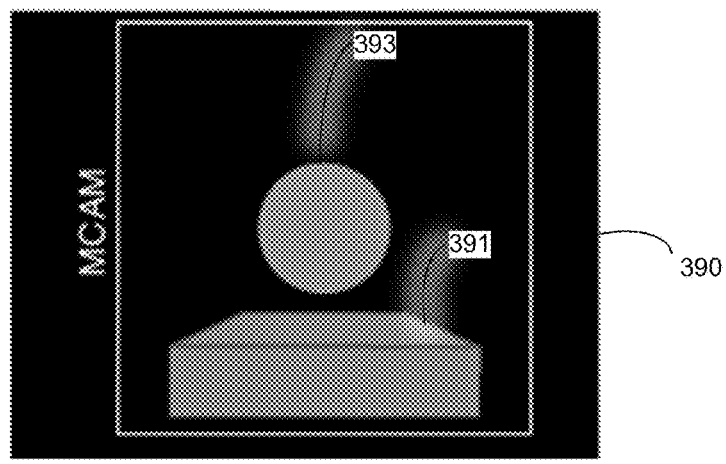
FIG. 3B is an illustrative diagram of post-warp occlusion in accordance with some implementations.
Figure 3B:
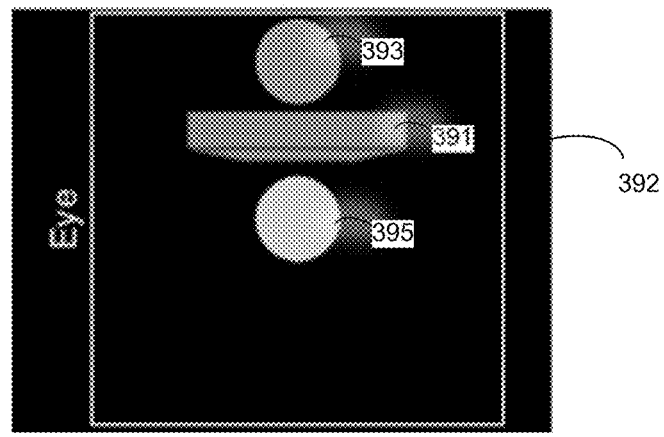
Figure 3B:
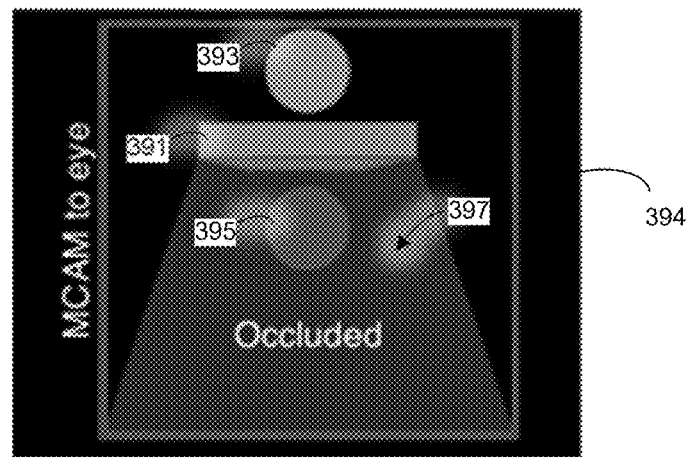

FIG. 3B is an illustrative diagram of post-warp occlusion in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 3B shows an image 390 of the environment captured by the $MCAM_L$ 310 that includes an obstacle 391 (e.g., a table-top or other planar surface) and a first object 393 located above the obstacle 391. FIG. 3B also shows an representative image 392 of the environment from the perspective of the left eye of the user 150 that includes the obstacle 391, the first object 393 located above the obstacle 391, and a second object 395 located below the obstacle 391. As such, for example, the image 390 does not include the second object 395 located below the obstacle 391 due to an offset/difference between the POVs of the $MCAM_L$ 310 and the left eye of the user 150.

As such, images from a respective MCAM (e.g., the $MCAM_L$ 310 associated with a left eye) are warped to account for the aforementioned POV differences in order to provide a more comfortable experience for the user 150. However, this warping operation may introduce holes in the warped images from the respective MCAM. As one example, FIG. 3B also shows a warped image 394 that corresponds to a warped version of the image 390. As shown in FIG. 3B, the warped image 394 includes an occluded area 397. In some implementations, hole filling and/or diffusion processes are performed on the warped image 394 to fill-out or complete the occluded area 397, which is described in more detail below with reference to FIGS. 4A and 4B.

Figure 3C:
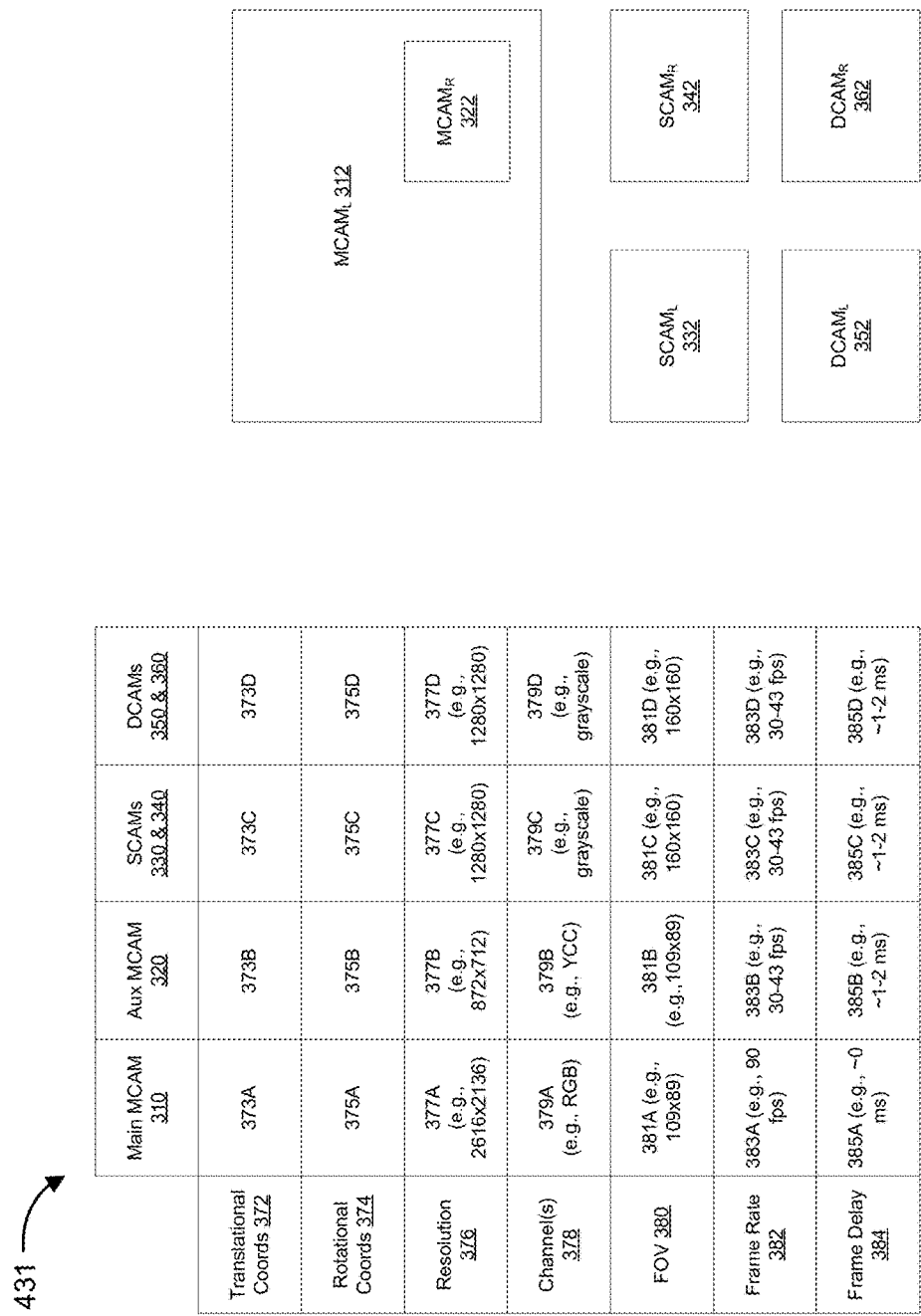
FIG. 3C is a block diagram of an example data structure for an intrinsic parameters library for the multi-camera architecture in FIG. 3A in accordance with some implementations.

FIG. 3C is a block diagram of an example data structure for an intrinsic parameters library 431 for the multi-camera architecture 300 in FIG. 3A in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the intrinsic parameters library 431 includes values for the following parameters for the each of the main $MCAM_L$ 310, the auxiliary $MCAM_R$ 320, the SCAMs 330 and 340, and the DCAMs 350 and 360: translational coordinates 372, rotational coordinates 374, resolution 376, channel(s) 378, field-of-view (FOV) 380, frame rate 382, and frame delay 384.

As shown in FIG. 3C, the main $MCAM_L$ 310 is associated with values 373A, 375A, 377A (e.g., 2616×2136), 379A (e.g., RGB), 381A (e.g., 109×89), 383A (e.g., 90 fps), and 385A (e.g., ~0 ms) for the translational coordinates 372, the rotational coordinates 374, the resolution 376, the channel(s) 378, the FOV 380, the frame rate 382, and the frame delay 384 intrinsic parameters, respectively.

As shown in FIG. 3C, the auxiliary $MCAM_R$ 320 is associated with values 373B, 375B, 377B (e.g., 872×712), 379B (e.g., YCC), 381B (e.g., 109×89), 383B (e.g., 30-45 fps), and 385B (e.g., ~1-2 ms) for the translational coordinates 372, the rotational coordinates 374, the resolution 376, the channel(s) 378, the FOV 380, the frame rate 382, and the frame delay 384 intrinsic parameters, respectively.

As shown in FIG. 3C, the SCAMs 330 and 340 are associated with values 373C, 375C, 377C (e.g., 1280×1280), 379C (e.g., grayscale), 381C (e.g., 160×160), 383C (e.g., 30-45 fps), and 385C (e.g., ~1-2 ms) for the translational coordinates 372, the rotational coordinates 374, the resolution 376, the channel(s) 378, the FOV 380, the frame rate 382, and the frame delay 384 intrinsic parameters, respectively.

As shown in FIG. 3C, the DCAMs 350 and 360 are associated with values 373D, 375D, 377D (e.g., 1280×1280), 379D (e.g., grayscale), 381D (e.g., 160×160), 383D (e.g., 30-45 fps), and 385D (e.g., ~1-2 ms) for the translational coordinates 372, the rotational coordinates 374, the resolution 376, the channel(s) 378, the FOV 380, the frame rate 382, and the frame delay 384 intrinsic parameters, respectively.

One of ordinary skill in art will appreciate that the values for the aforementioned values and parameters are merely examples and may be different in other implementations. One of ordinary skill in art will appreciate that FIG. 3C is described from the perspective of the first image processing pipeline architecture 400 in FIG. 4A for a first eye (e.g., left eye) of the user 150. To that end, one of ordinary skill in art will appreciate that the MCAMs are switched for the second image processing pipeline architecture 475 in FIG. 4B for a second eye (e.g., right eye) of the user 150 with the $MCAM_R$ 320 as the main MCAM and the $MCAM_L$ 310 as the auxiliary MCAM.

Figure 4A:
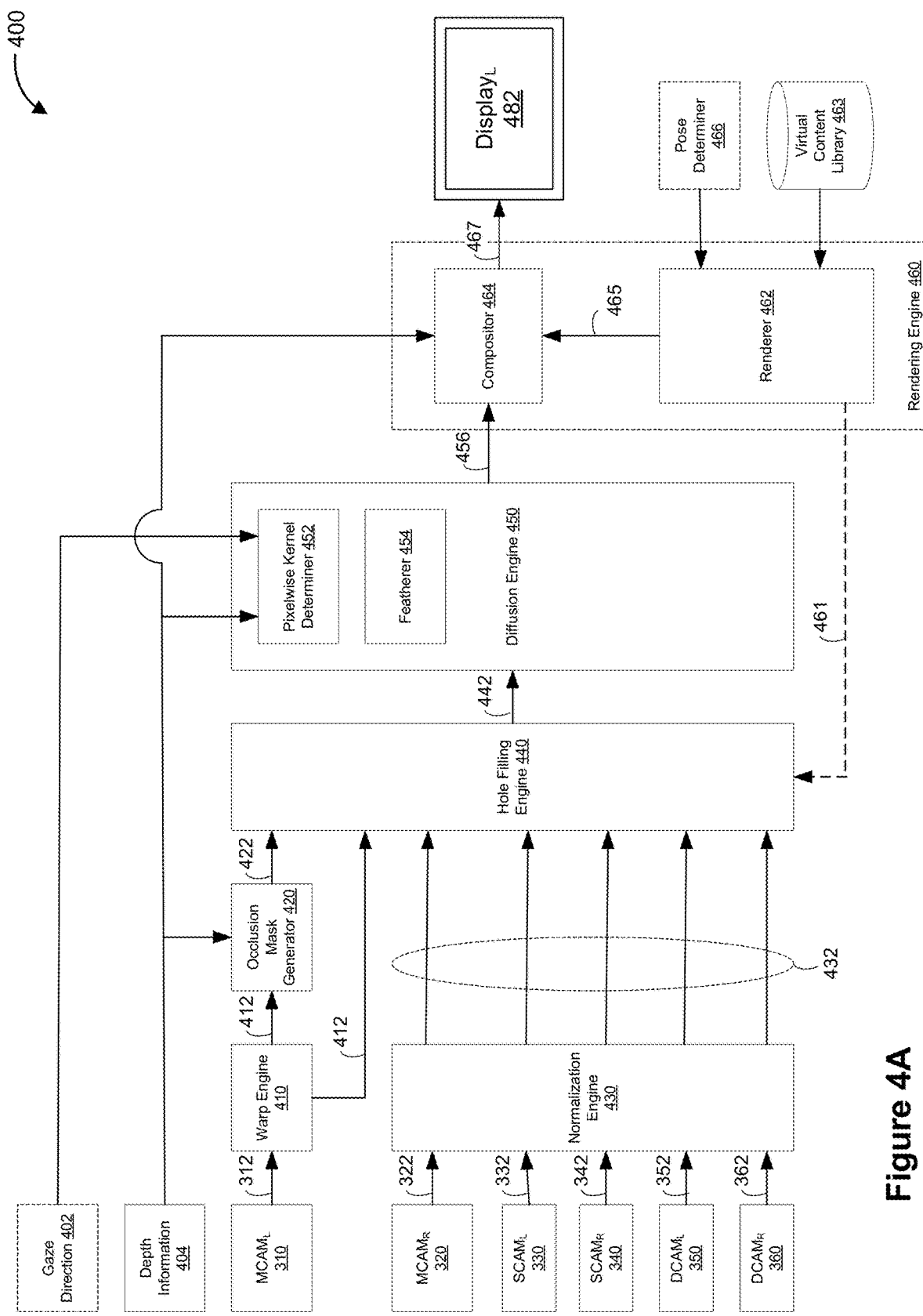
FIG. 4A illustrates a block diagram of a first example image processing pipeline architecture in accordance with some implementations.

FIG. 4A illustrates a block diagram of a first example image processing pipeline architecture 400 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the first image processing pipeline architecture 400 corresponds to a first $display_L$ 482 for a first eye (e.g., left eye) of the user 150.

As shown in FIG. 4A, the image 312 from the $MCAM_L$ 310 is fed to the warp engine 410. In some implementations, the warp engine 410 performs a warping operation/technique (e.g., dense depth reprojection or the like) on the image 312 from the $MCAM_L$ 310 to generate a first warped image 412. For example, the first warped image 412 accounts for the offset/difference between the translational/rotational coordinates of the user's eye (e.g., left eye) and the translational/rotational coordinates of the $MCAM_L$ 310.

As shown in FIG. 4A, the occlusion mask generator 420 determines/generates an occlusion mask 422 based on the first warped image 412 and depth information 404 relative to at least one of the MCAM$_L$ 310 and the first eye (e.g., left eye) of the user 150. According to some implementations, the occlusion mask 422 indicates holes in the first warped image 412. In some situations, the warping process generates occlusions and disocclusions with respect to physical objects in the physical environment. In particular, disocclusions are problematic as disocclusions are regions in the warped image that were previously not visible from the original POV but are now "visible" because the POV change also changed the position with respect to an occluding physical object or the like. This effectively creates "holes" to be filled. For example, an occlusion mask generation process is described below in more detail with reference to FIG. 5.

As shown in FIG. 4A, the image 322 from the MCAM$_R$ 320, the image 332 from the SCAM$_L$ 330, the image 342 from the SCAM$_R$ 340, the image 352 from the DCAM$_L$ 350, and the image 362 from the DCAM$_R$ 360 are fed to the normalization engine 430. In some implementations, the normalization engine 430 normalizes each of the aforementioned images 322, 332, 342, 352, and 362 based on a difference between the intrinsic parameters for the MCAM$_L$ 310 and the respective image sensor in order to produce a set of normalized images 432. In some implementations, the normalization engine 430 obtains (e.g., receives or retrieves) the intrinsic parameters for the various image sensors from the intrinsic parameters library 431.

As shown in FIG. 4A, the hole filling engine 440 fills holes of the occlusion mask 422 based on at least one of the set of normalized images 432 to produce a modified first image 442. As shown in FIG. 4A, the diffusion engine 450 performs a pixelwise diffusion process on the modified first image 442 using a diffusion kernel to fill additional holes of the occlusion mask 422 to generate a diffused first image 456. In some implementations, the pixelwise kernel determiner 452 determines/generates the diffusion kernel based on the depth of a subject pixel according to the depth information 404. In some implementations, the pixelwise kernel determiner 452 determines/generates the diffusion kernel based on a determination as to whether a subject pixel is within a focus region, wherein the focus region is determined based at least in part on a gaze direction 402. In some implementations, the featherer 454 performs a feathering operation on pixels associated with the pixelwise diffusion process in order to smooth discontinuities therein.

As shown in FIG. 4A, the renderer 462 renders XR content 465 from the virtual content library 463 relative to a current camera pose from the camera pose determiner 466. In some implementations, the renderer 462 provides an indication 461 of the location of the rendered XR content 465 to the hole filling engine 440. In some implementations, the hole filling engine 440 identifies a plurality of pixels in the warped first image 412 that will be covered by the XR content based on the indication 461 and foregoes filling holes associated with the identified plurality of pixels.

As shown in FIG. 4A, the compositor 464 composites the rendered XR content 465 with the diffused first image 456 based at least in part on the depth information 404 (e.g., to maintain z-order) to generate a rendered frame 467 of the XR environment. In turn, the first display$_L$ 482 for the first eye (e.g., the left eye) of the user 150 displays the rendered frame 467 of the XR environment. In some implementations, the compositor 464 obtains (e.g., receives, retrieves, determines/generates, or otherwise accesses) the depth information 404 (e.g., a point cloud, depth mesh, or the like) associated with the scene (e.g., the physical environment 105 in FIG. 1) to maintain z-order between the rendered XR content and physical objects in the physical environment.

Figure 4B:
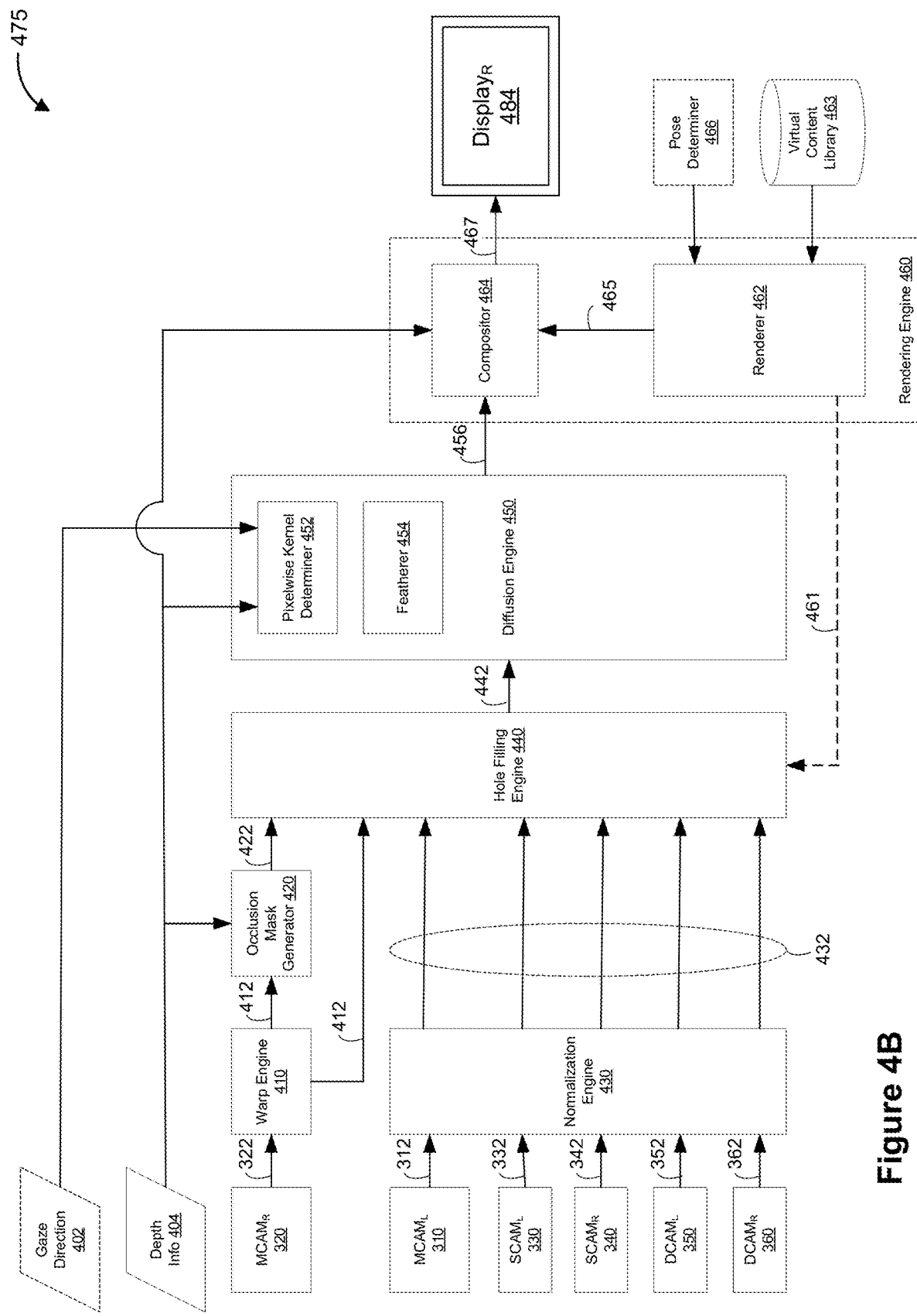
FIG. 4B illustrates a block diagram of a second example image processing pipeline architecture in accordance with some implementations.

FIG. 4B illustrates a block diagram of a second example image processing pipeline architecture 475 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the second image processing pipeline architecture 475 corresponds to a second display$_R$ 484 for a second eye (e.g., right eye) of the user 150. The second image processing pipeline architecture 475 in FIG. 4B is similar to and adapted from the first image processing pipeline architecture 400 in FIG. 4A. As such, similar reference numbers are used herein and only the differences therebetween will be described for the sake of brevity.

As shown in FIG. 4B, the image 322 from the MCAM$_R$ 320 is fed to the warp engine 410. In some implementations, the warp engine 410 performs a warping operation/technique (e.g., dense depth reprojection or the like) on the image 322 from the MCAM$_R$ 320 to generate a first warped image 412. For example, the first warped image accounts for the offset/difference between the translational/rotational coordinates of the user's eye (e.g., right eye) and the translational/rotational coordinates of the MCAM$_R$ 320.

As shown in FIG. 4B, the image 312 from the MCAM$_L$ 310, the image 332 from the SCAM$_L$ 330, the image 342 from the SCAM$_R$, the image 352 from the DCAM$_L$ 350, and the image 362 from the DCAM$_R$ are fed to the normalization engine 430. In some implementations, the normalization engine 430 normalizes each of the aforementioned images 312, 332, 342, 352, and 362 based on a difference between the intrinsic parameters for the MCAM$_R$ 320 and the respective image sensor in order to produce a set of normalized images 432. In some implementations, the normalization engine 430 obtains (e.g., receives or retrieves) the intrinsic parameters for the various image sensors from the intrinsic parameters library 431.

As shown in FIG. 4B, the compositor 464 composites the rendered XR content 465 with the diffused first image 456 based at least in part on the depth information 404 (e.g., in order to maintain z-order) to generate a rendered frame 467 of the XR environment. In turn, the second display$_R$ 484 for the second eye (e.g., the right eye) of the user 150 displays the rendered frame 467 of the XR environment.

Figure 5:
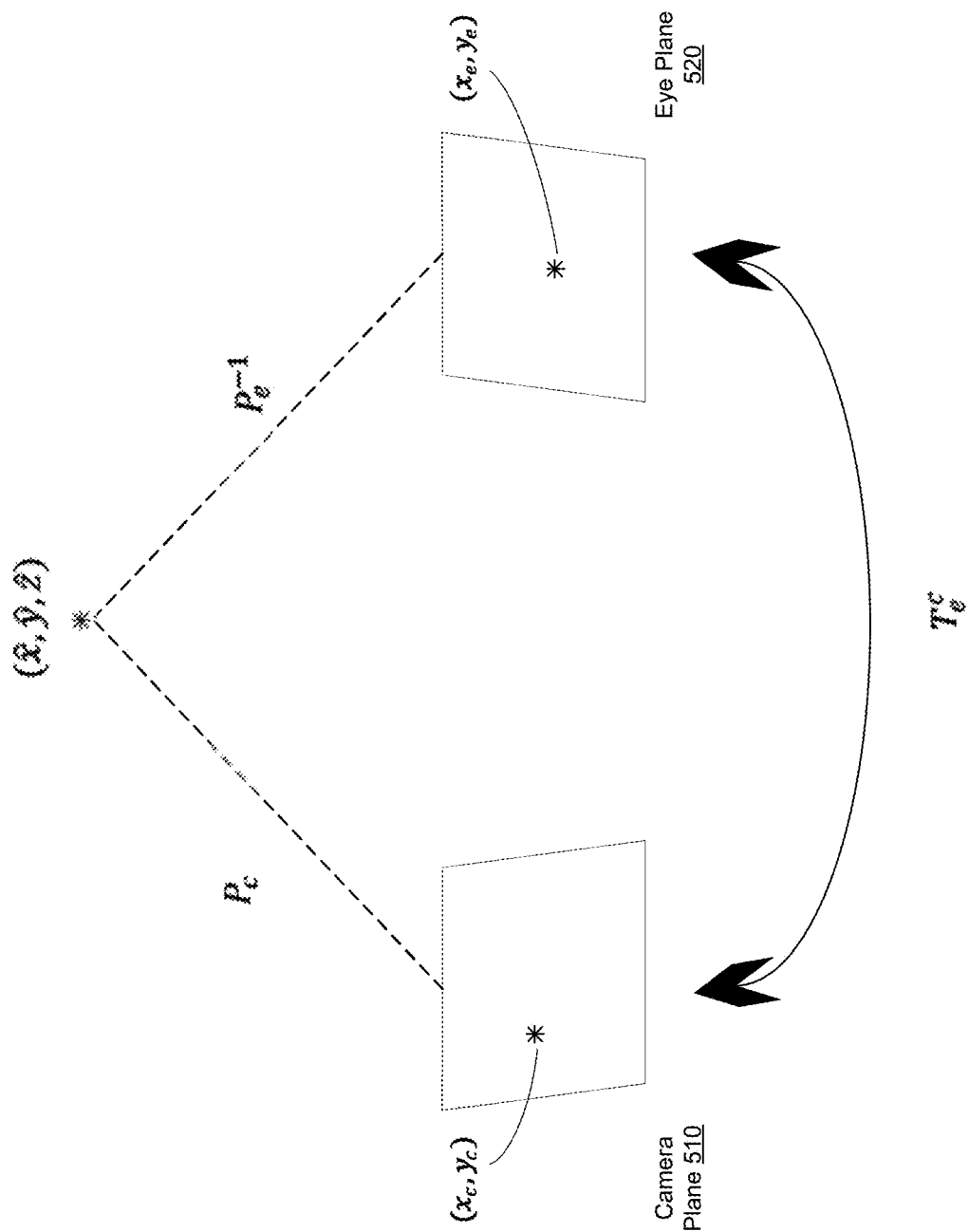
FIG. 5 is an illustrative diagram of an occlusion mask generation process in accordance with some implementations.

FIG. 5 is an illustrative diagram of an occlusion mask generation process in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

As shown in FIG. 5, a point ($x_e$, $y_e$) in the 2D eye plane 520 may be transformed to a point ($x_c$, $y_c$) in the 2D camera plane 510 based on equation (4) below.

$$\begin{bmatrix} x_c \\ y_c \\ 1 \end{bmatrix} \leftarrow P_c P_e^{-1} \begin{bmatrix} x_e \\ y_e \\ 1 \\ \dfrac{1}{\text{depth}(x_e, y_e)} \end{bmatrix} \quad (4)$$

In equation (4), $$P_c = K_c \begin{bmatrix} R_c & T_c \\ 0 & 1 \end{bmatrix} \text{ and } P_e = K_e \begin{bmatrix} R_e & T_e \\ 0 & 1 \end{bmatrix} \quad (4)$$

are 4×4 projection matrices mapping 3D scene points in projective space to the camera and the eye pixels, respectively. One of ordinary skill in the art will appreciate how equations (4)-(6) correlate with the transformations 252 and 254 described above with respect to FIG. 2.

As such, in this example, the occlusion mask is generated based on known depth values relative to both the camera plane 510 and the eye plane 520. In greater detail, according to some implementations, an eye pixel ($x_e$, $y_e$) may be flagged as an occlusion if the difference between its depth and the visible depth at the corresponding camera pixel ($x_c$, $y_c$) is too large. One way to verify this is to perform a roundtrip check outlined by equations (5) and (6) below.

$$\|(x_e, y_e) - (\hat{x}_e, \hat{y}_e)\| > \tau \text{ with} \quad (5)$$

$$\begin{bmatrix} \hat{x}_e \\ \hat{y}_e \\ 1 \end{bmatrix} \leftarrow P_e P_c^{-1} \begin{bmatrix} x_c \\ y_c \\ 1 \\ \frac{1}{\text{depth}(x_c, y_c)} \end{bmatrix} \quad (6)$$

where τ corresponds to a pixel distance threshold.

One of ordinary skill in the art will appreciate that the occlusion mask may also be generated based on a depth value relative to one of the camera plane 510 and the eye plane 520 in some implementations. In other words, in some situations, one of depth($x_e$, $y_e$) and depth($x_e$, $y_e$) is known.

Figure 6A:
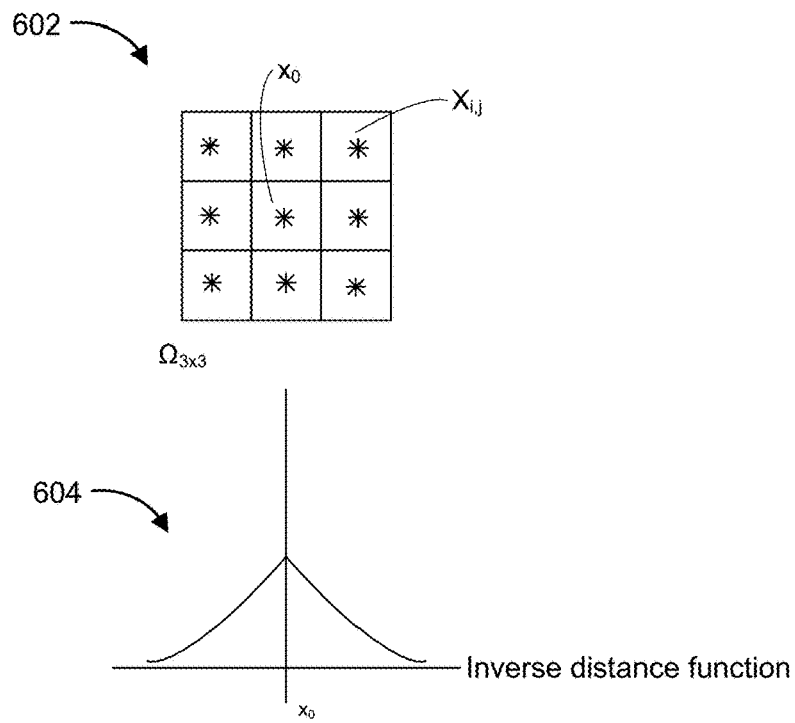
FIGS. 6A and 6B illustrate example diffusion techniques in accordance with some implementations.
Figure 6B:
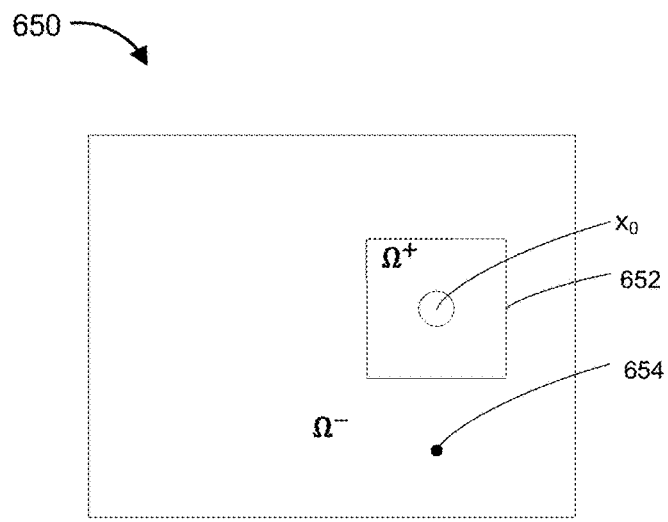

FIGS. 6A and 6B illustrate example diffusion techniques in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

According to some implementations, as shown in FIG. 6A, a diffusion kernel 602 (e.g., the size and weights thereof) is based at least in part on the depth of pixels in the diffusion kernel as well as the distance of subject pixels to the reference pixel. For example, in this way, pixels within the foreground are associated with a smaller diffusion kernel for greater resolution. As shown in FIG. 6A, the diffusion kernel 602 is a 3×3 matrix. In this example, $x_0$ is the reference pixel in the center of the diffusion kernel 602, which is surrounded by other pixels $x_{i,j}$ that fill-out the 3×3 matrix associated with the diffusion kernel 602 (sometimes also referred to as $\Omega_{3\times3}$).

A weight w(x) is assigned to each pixel in the diffusion kernel 602 using a neighborhood weight function defined as equation (7) below.

$$w(x, x_0) = w_s(x, x_0) \cdot w_d(\text{depth}(x), \text{depth}(x_0)) \quad (7)$$

The neighborhood weight function in equation (7) may be separated into a depth weighting function that corresponds to equation (8) and a spatial weighting function that corresponds to equation (9).

$$w_d(\text{depth}(x), \text{depth}(x_0)) = \text{depth}(x)^P \quad (8)$$

$$w_s(x, x_0) = e^{-\frac{1}{2}\left(\frac{x-x_0}{\sigma_s}\right)^2} \quad (9)$$

In equation (8), P is an exponent that puts more weight on the background where depth values are larger (e.g., when P>>1). In equation (9), $\sigma_s$ represents a standard deviation with respect to the center of the diffusion kernel 602. As such, pixels further away from the reference pixel $x_0$ are given lower weights according to the inverse distance function 604 illustrated in FIG. 6A. Furthermore, the resultant value $I_{i+1}(x_0)$ for the reference pixel $x_0$ may be defined by equation (10) below.

$$I_{i+1}(x_0) = \frac{\sum_{k \in \Omega_i} w(x, x_0) \cdot I_i(x)}{\sum_{k \in \Omega_i} w(x, x_0)} \quad (10)$$

In equation (10), $\Omega_i$ represents the current iteration neighborhood, whereas $\Omega_0$ includes non-occluded pixels but is gradually filled in by the diffusion kernel 602 at each iteration. As such, in some implementations, the diffusion process is iterative in nature and gradually fills occluded areas with varying neighborhoods of pixels at each iteration.

According to some implementations, as shown in FIG. 6B, a diffusion kernel (e.g., the size and weights thereof) is foveated based at least in part on a focal point/region determination. To this end, the system identifies a focal region 652 of an image 650 based on gaze direction and weights pixels within the focal region 652 higher than pixels in the balance 654 of the image 650. As such, diffusion may be performed at a higher resolution on pixels within the focal region 652.

For example, the reference pixel $x_0$ within the focal region 652 may be associated with a diffusion kernel $\Omega^+$, and pixels outside of the focal region 652 may be associated with a diffusion kernel $\Omega^-$. In some implementations, the diffusion kernel $\Omega^+$ may be performed in color with a higher resolution than the diffusion kernel $\Omega^-$, which may be performed at a lower resolution with luma values.

As such, the following set of equations (11) addresses the overall treatment of the image 650 during the foveated diffusion process.

$$f(x, x_{gaze}) = e^{-\frac{1}{2}\left(\frac{x-x_{gaze}}{\sigma_e}\right)^2} \quad (11)$$

$$I(x) = (f(x) \cdot \Omega^+) + ((1 - f(x)) \cdot \Omega^-)$$

In equation (11), $\sigma_e$ represents a standard deviation with respective to the gaze direction defines as $x_{gaze}$.

Figure 7:
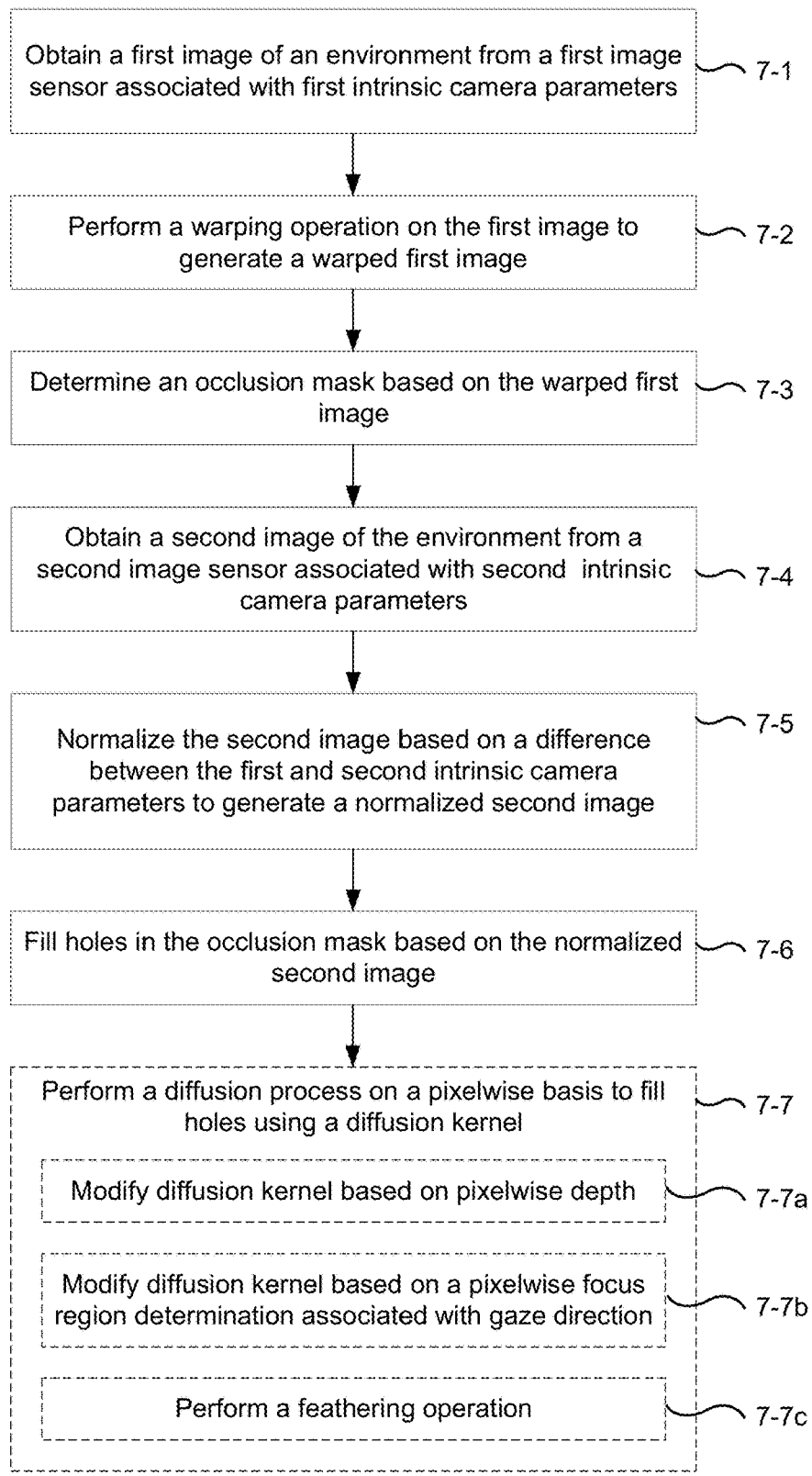
FIG. 7 is a flowchart representation of a method of multi-camera hole filling in accordance with some implementations.

FIG. 7 is a flowchart representation of a method 700 of multi-camera hole filling in accordance with some implementations. In various implementations, the method 700 is performed by at a computing system including non-transitory memory and one or more processors, wherein the computing system is communicatively coupled to a first image sensor and a second image sensor (e.g., the controller 110 in FIGS. 1 and 9; the electronic device 120 in FIGS. 1 and 10; or a suitable combination thereof), or a component thereof. For example, the electronic device corresponds to the near-eye system 305 in FIG. 3A with one or more forward-facing MCAMs, one or more side-facing SCAMs, and/or one or more downward-facing DCAMs. In some implementations, the method 700 is performed by processing logic, including hardware, firmware, software, or a combination thereof. In some implementations, the method 700 is performed by a processor executing code stored in a non-transitory computer-readable medium (e.g., a memory). In various implementations, some operations in method 700 are, optionally, combined and/or the order of some operations is, optionally, changed.

As noted above, in some instances, a near-eye system (e.g., with video-pass through of a physical environment) may include a plurality of exterior-facing image sensors (i.e., cameras) such as one or more forward-facing cameras (MCAMs), one or more side-facing cameras (SCAMs), and/or one or more downward-facing cameras (DCAMs) that may be associated with different intrinsic camera characteristics (e.g., resolution, frame rate, field-of-view (FOV), frame delay, color space, and/or the like). As a first problem, the points of view (POVs) of the forward-facing image sensor and a user of the near-eye system are different, for example, the forward-facing image sensor is closer to the physical environment than the user's POV and may be offset from the position of the user's eyes. As such, images from a respective MCAM (e.g., associated with a left eye) are warped to account for the aforementioned POV differences in order to provide a more comfortable experience for the user. However, this warping process may introduce holes (e.g., including occlusions and disocclusions) in the warped images from the respective MCAM. The warping process generates occlusions and disocclusions with respect to physical objects in the physical environment. In particular, disocclusions are problematic as disocclusions are regions in the warped image that were previously not visible from the original POV but are now "visible" because the POV change also changed the position with respect to an occluding physical object or the like. This effectively creates "holes" to be filled.

Thus, as described herein, in some implementations, images from the other MCAM (e.g., associated with a right eye), the SCAM(s), and the DCAM(s) may be used to fill the holes but are normalized to account for the different intrinsic camera characteristics. Finally, a diffusion and feathering process may be performed on the images from the other MCAM to fill any remaining holes, wherein the diffusion and feathering process is based on a diffusion kernel that accounts for depth and/or displacement/distance.

As represented by block 7-1, the method 700 includes obtaining a first image of an environment from a first image sensor associated with first intrinsic camera parameters. For example, with reference to FIGS. 3A-3C, the left main (forward-facing) camera 310 captures an image 312 of the environment according to its intrinsic parameters (e.g., 2616×2136 resolution). In some implementations, the first intrinsic camera parameters include a first resolution, a first FOV, a first frame rate, a first frame delay, a first color space, and/or the like. In some implementations, the environment corresponds to a physical environment, a partially XR environment, a fully XR environment, and/or the like.

As represented by block 7-2, the method 700 includes performing a warping operation on the first image to generate a warped first image. For example, with reference to FIG. 4A, the warp engine 410 performs a warping operation/technique (e.g., dense depth reprojection or the like) on the image 312 from the $MCAM_L$ 310 to generate a first warped image 412. For example, the first warped image accounts for the offset/difference between the translational/rotational coordinates of the user's eye (e.g., left eye) and the translational/rotational coordinates of the $MCAM_L$ 310. In some implementations, the warping operation corresponds to dense depth reprojection. According to some implementations, the warping operation accounts for rotational and/or translational offsets between the first image sensor's POV and the POV of an associated eye of the user.

As represented by block 7-3, the method 700 includes determining an occlusion mask based on the warped first image. In some implementations, the occlusion mask includes a plurality of holes. For example, with reference to FIG. 4A, the occlusion mask generator 420 determines/generates an occlusion mask 422 based on the first warped image 412 and depth information 404 relative to at least one of the $MCAM_L$ 310 and the first eye (e.g., left eye) of the user 150. According to some implementations, the occlusion mask 422 indicates holes in the first warped image 412. For example, an occlusion mask generation process is described above in more detail with reference to FIG. 5. In some implementations, the occlusion mask is determined based at least in part on a first set of depth values relative to a first perspective associated with the first image sensor and a second set of depth values relative to a second perspective associated with the second image sensor different from the first perspective. For example, the second perspective corresponds to an eye of a user of the device.

As represented by block 7-4, the method 700 includes obtaining a second image of the environment from a second image sensor associated with second intrinsic camera parameters. For example, with reference to FIGS. 3A-3C, the right main (forward-facing) camera 320 captures an image 322 of the environment according to its intrinsic parameters (e.g., 872×712 resolution). In some implementations, the second intrinsic camera parameters include a second resolution, a second FOV, a second frame rate, a second frame delay, a second color space, and/or the like. As one example, the first and second intrinsic parameters include at least one similar resolution, FOV, frame rate, frame delay, or color space. As another example, the first and second intrinsic parameters include mutually exclusive resolutions, FOVs, frame rates, frame delays, and color spaces.

As represented by block 7-5, the method 700 includes normalizing the second image based on a difference between the first and second intrinsic camera parameters to generate a normalized second image. For example, with reference to FIG. 4A, the normalization engine 430 normalizes the image 322 from the right main (forward-facing) camera 320 based on a difference between the intrinsic parameters for the $MCAM_L$ 310 and the intrinsic parameters for the $MCAM_R$ 320 in order to produce a second normalized image. In some implementations, the normalization engine 430 obtains (e.g., receives or retrieves) the intrinsic parameters for the various image sensors from the intrinsic parameters library 431. In some implementations, normalizing the second image corresponds to linear up-sampling using a guided or joint bilateral filter. In some implementations, normalizing the second image corresponds to linear down-sampling using a guided or joint bilateral filter.

As represented by block 7-6, the method 700 includes filling holes in the occlusion mask based on the normalized second image. For example, with reference to FIG. 4A, the hole filling engine 440 fills a first set of one or more holes of the occlusion mask 422 based on the normalized second image to produce a modified first image 442.

In some implementations, the method 700 includes skipping hole filling for pixels in the occlusion mask that are slated to be covered by virtual content. For example, with reference to FIG. 4A, the hole filling engine 440 identifies a plurality of pixels in the warped first image 412 that will be covered by the XR content based on the indication 461 and foregoes filling holes associated with the plurality of pixels.

In some implementations, as represented by block 7-7, the method 700 includes performing a diffusion process on a pixelwise basis to fill holes using a diffusion kernel. For example, with reference to FIG. 4A, the diffusion engine 450 performs a pixelwise diffusion process on the modified first image 442 using a diffusion kernel to fill a second set of one or more holes of the occlusion mask 422 to generate a diffused first image 456. According to some implementations, the first and second sets of one or more holes may be associate with mutually exclusive holes. According to some implementations, the first and second sets of one or more holes may be associated with at least some similar/overlapping holes.

In some implementations, as represented by block 7-7a, the method 700 includes modifying the diffusion kernel (e.g., the size and weights thereof) based on pixelwise depth. For example, with reference to FIG. 4A, the pixelwise kernel determiner 452 determines/generates the diffusion kernel based on the depth of a subject pixel according to the depth information 404. As such, pixels within the foreground are associated with a smaller diffusion kernel for greater resolution. Dynamic generation of the diffusion kernel based on depth and/or displacement/distance is described in more detail above with reference to FIG. 6A.

In some implementations, as represented by block 7-7b, the method 700 includes modifying the diffusion kernel (e.g., the size and weights thereof) based on a pixelwise focus region determination associated with gaze direction. As such, pixels within the focus region are associated with a smaller diffusion kernel for greater resolution. For example, with reference to FIG. 4A, the pixelwise kernel determiner 452 determines/generates the diffusion kernel based on a determination as to whether a subject pixel is within a focus region, wherein the focus region is determined based at least in part on a gaze direction 402. Foveated diffusion is described in more detail above with reference to FIG. 6B.

In some implementations, as represented by block 7-7c, the method 700 includes performing a feathering operation. example, with reference to FIG. 4A, the featherer 454 performs a feathering operation on pixels associated with the pixelwise diffusion process in order to smooth discontinuities therein.

Figure 8A:
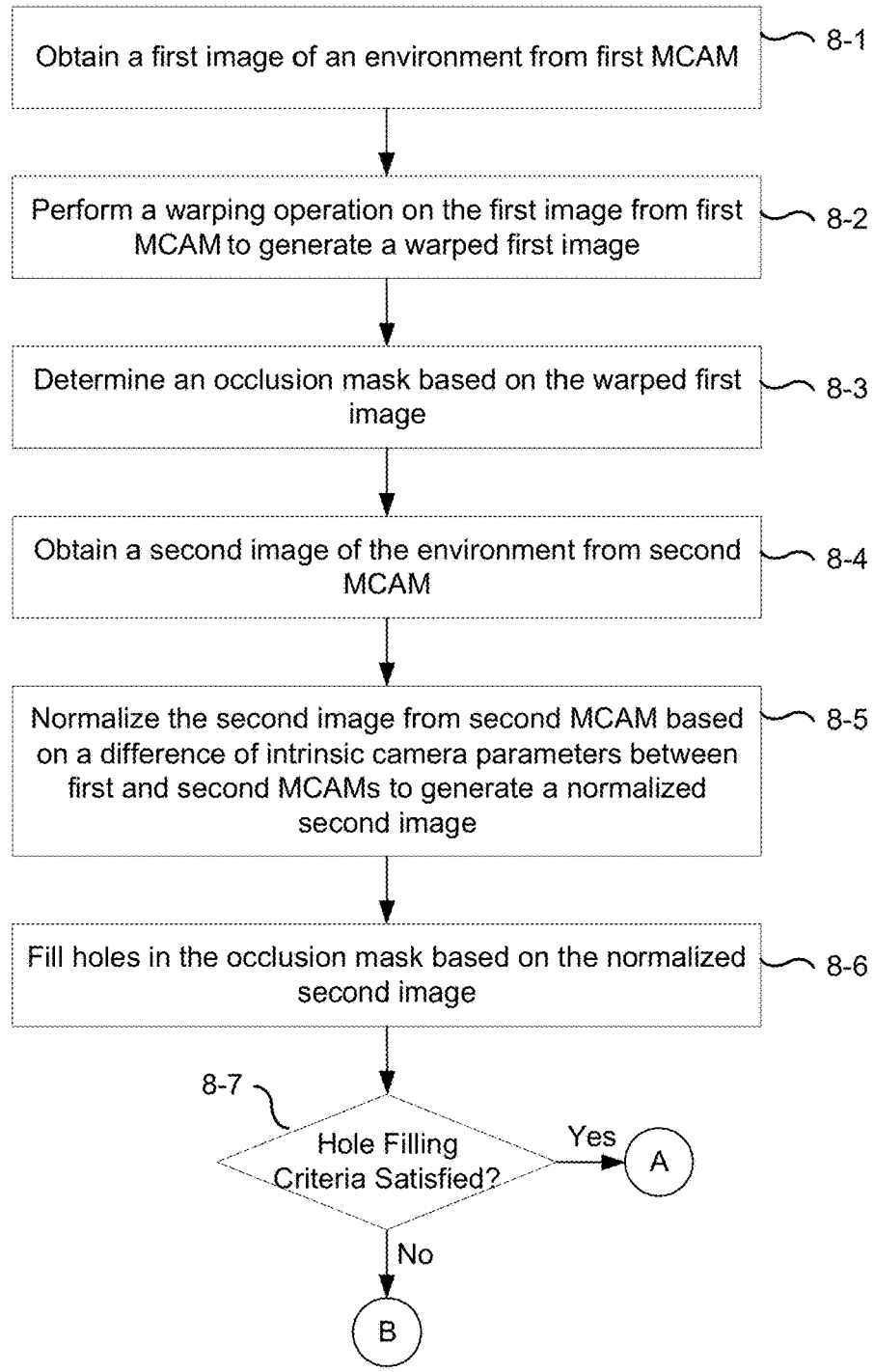
FIGS. 8A and 8B show a flowchart representation of a method of multi-camera hole filling in accordance with some implementations.
Figure 8B:
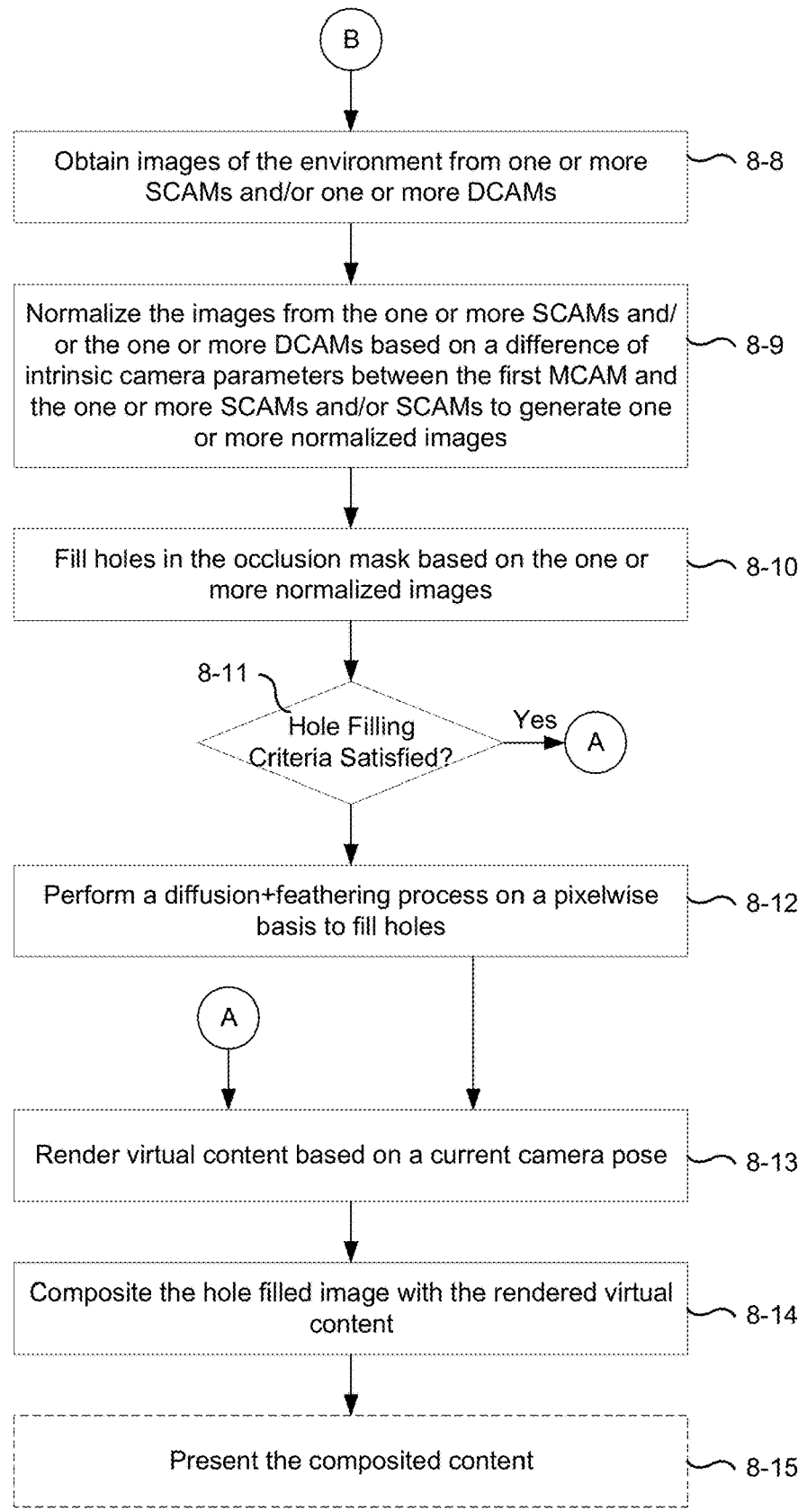

FIGS. 8A and 8B show a flowchart representation of a method 800 of multi-camera hole filling in accordance with some implementations. In various implementations, the method 800 is performed by at a computing system including non-transitory memory and one or more processors, wherein the computing system is communicatively coupled to a first image sensor and a second image sensor (e.g., the controller 110 in FIGS. 1 and 9; the electronic device 120 in FIGS. 1 and 10; or a suitable combination thereof), or a component thereof. For example, the electronic device corresponds to the near-eye system 305 in FIG. 3A with one or more forward-facing MCAMs, one or more side-facing SCAMs, and/or one or more downward-facing DCAMs. In some implementations, the method 800 is performed by processing logic, including hardware, firmware, software, or a combination thereof. In some implementations, the method 800 is performed by a processor executing code stored in a non-transitory computer-readable medium (e.g., a memory). In various implementations, some operations in method 800 are, optionally, combined and/or the order of some operations is, optionally, changed.

As described above, in some instances, a near-eye system (e.g., with video-pass through of a physical environment) may include a plurality of exterior-facing image sensors (i.e., cameras) such as one or more MCAMs, one or more SCAMs, and/or one or more DCAMs that may be associated with different intrinsic camera characteristics (e.g., resolution, frame rate, FOV, frame delay, color space, and/or the like). As a first problem, the POVs of the forward-facing image sensor and a user of the near-eye system are different, for example, the forward-facing image sensor is closer to the physical environment than the user's POV and may be offset from the position of the user's eyes. As such, images from a respective MCAM (e.g., associated with a left eye) are warped to account for the aforementioned POV differences in order to provide a more comfortable experience for the user. However, this warping process may introduce holes in the warped images from the respective MCAM. Thus, as described herein, in some implementations, images from the other MCAM (e.g., associated with a right eye), the SCAM(s), and the DCAM(s) may be used to fill the holes but are normalized to account for the different intrinsic camera characteristics.

As represented by block 8-1, in FIG. 8A, the method 800 includes obtaining a first image of an environment from a first MCAM. For example, with reference to FIG. 4A, the $MCAM_L$ 310 captures the image 312 of the environment.

As represented by block 8-2, the method 800 includes performing a warping operation on the first image from the first MCAM to generate a warped first image. For example, with reference to FIG. 4A, the warp engine 410 performs a warping operation/technique (e.g., dense depth reprojection or the like) on the image 312 from the $MCAM_L$ 310 to generate a first warped image 412.

As represented by block 8-3, the method 800 includes determining an occlusion mask based on the warped first image. For example, with reference to FIG. 4A, the occlusion mask generator 420 determines/generates an occlusion mask 422 based on the first warped image 412 and depth information 404 relative to at least one of the $MCAM_L$ 310 and the first eye (e.g., left eye) of the user 150. According to some implementations, the occlusion mask 422 indicates holes in the first warped image 412. For example, an occlusion mask generation process is described above in more detail with reference to FIG. 5.

As represented by block 8-4, the method 800 includes obtaining a second image of the environment from a second MCAM. For example, with reference to FIG. 4A, the $MCAM_R$ 320 captures the image 322 of the environment.

As represented by block 8-5, the method 800 includes normalizing the second image from the second MCAM based on a difference of intrinsic camera parameters between first and second MCAMs to generate a normalized second image. For example, with reference to FIG. 4A, the normalization engine 430 normalizes the image 322 based on a difference between the intrinsic parameters for the $MCAM_L$ 310 and the $MCAM_R$ 320 to produce a normalized second image.

As represented by block 8-6, the method 800 includes filling holes in the occlusion mask based on the normalized second image. For example, with reference to FIG. 4A, the hole filling engine 440 fills holes of the occlusion mask 422 based on the normalized second image.

As represented by block 8-7, the method 800 includes determining whether hole filling criteria are satisfied. In some implementations, the hole filling criteria are satisfied when at least a threshold percentage of holes in the occlusion mask have been filled (e.g., 75%, 90%, 99.99%, etc.). If the hole filling criteria are satisfied, the method 800 continues to block 8-13. However, if the hole filling criteria are not satisfied, the method 800 continues to block 8-8.

As represented by block 8-8, in FIG. 8B, the method 800 includes obtaining images of the environment from one or more SCAMs and/or one or more DCAMs For example, with reference to FIG. 4A, the $SCAM_L$ 330 captures the image 332 of the environment, the $SCAM_R$ 340 captures the image 342 of the environment, the $DCAM_L$ 350 captures the image 352 of the environment, and/or from the $DCAM_R$ 360 captures the image 362 of the environment.

In some implementations, images from the from one or more SCAMs and/or one or more DCAMs are prioritized (or weighted) based on the image processing pipeline. For example, if the image processing pipeline corresponds to a right eye of the user 150 (e.g., as shown in FIG. 4B), the $MCAM_R$ 320 corresponds to the main MCAM and the $MCAM_L$ 310 corresponds to the auxiliary MCAM. Moreover, in this example, images from the $SCAM_R$ 340 and the $DCAM_R$ 360 may be prioritized (or weighted more heavily) than the images from the $SCAM_L$ 330 and the $DCAM_L$ 350.

As represented by block 8-9, the method 800 includes normalizing the images from the one or more SCAMs and/or the one or more DCAMs based on a difference of intrinsic camera parameters between the first MCAM and the one or more SCAMs and/or the one or more DCAMs to generate one or more normalized images. For example, with reference to FIG. 4A, the normalization engine 430 normalizes at least some of the images 332, 342, 352, and/or 362 based on a difference between the intrinsic parameters for the $MCAM_L$ 310 and the $SCAM_L$ 330, the $SCAM_R$ 340, the $DCAM_L$ 350, and/or the $DCAM_R$ 360 to produce one or more normalized images.

As represented by block 8-10, the method 800 includes filling holes in the occlusion mask based on at least some of the one or more normalized images from block 8-9. For example, with reference to FIG. 4A, the hole filling engine 440 fills holes of the occlusion mask 422 based on the one or more normalized images.

As represented by block 8-11, the method 800 includes determining whether hole filling criteria are satisfied. In some implementations, the hole filling criteria are satisfied when at least a threshold percentage of holes in the occlusion mask have been filled (e.g., 75%, 90%, 99.99%, etc.). If the hole filling criteria are satisfied, the method 800 continues to block 8-13. However, if the hole filling criteria are not satisfied, the method 800 continues to block 8-12.

As represented by block 8-12, the method 800 includes performing a diffusion and feathering process on a pixelwise basis to additional fill holes. For example, with reference to FIG. 4A, the diffusion engine 450 performs a pixelwise diffusion process on the modified first image 442 using a diffusion kernel to fill additional holes of the occlusion mask 422 to generate a diffused first image 456.

As represented by block 8-13, the method 800 includes rendering virtual content based on a current camera pose. For example, with reference to FIG. 4A, the renderer 462 renders XR content from the virtual content library 463 according to a current camera pose from the camera pose determiner 466 relative thereto.

As represented by block 8-14, the method 800 includes compositing the hole filled image of the environment with the rendered virtual content. For example, with reference to FIG. 4A, the compositor 464 composites the rendered XR content 465 with the diffused first image 456 based at least in part on the depth information 404 (e.g., to maintain z-order) to generate a rendered frame 467 of the XR environment.

In some implementations, as represented by block 8-15, the method 800 optional includes presenting or causing presentation of the composited content from block 8-14. For example, with reference to FIG. 4A, the first $display_L$ 482 for the first eye (e.g., the left eye) of the user 150 displays the rendered frame 467 of the XR environment. One of ordinary skill in the art will appreciate that the first image processing pipeline architecture 400 in FIG. 4A corresponds to a first $display_L$ 482 for a first eye (e.g., left eye) of the user 150 and that an image processing pipeline architecture for a second eye (e.g., right eye) of the user may be performed in parallel (e.g., as shown in FIG. 4B).

Figure 9:
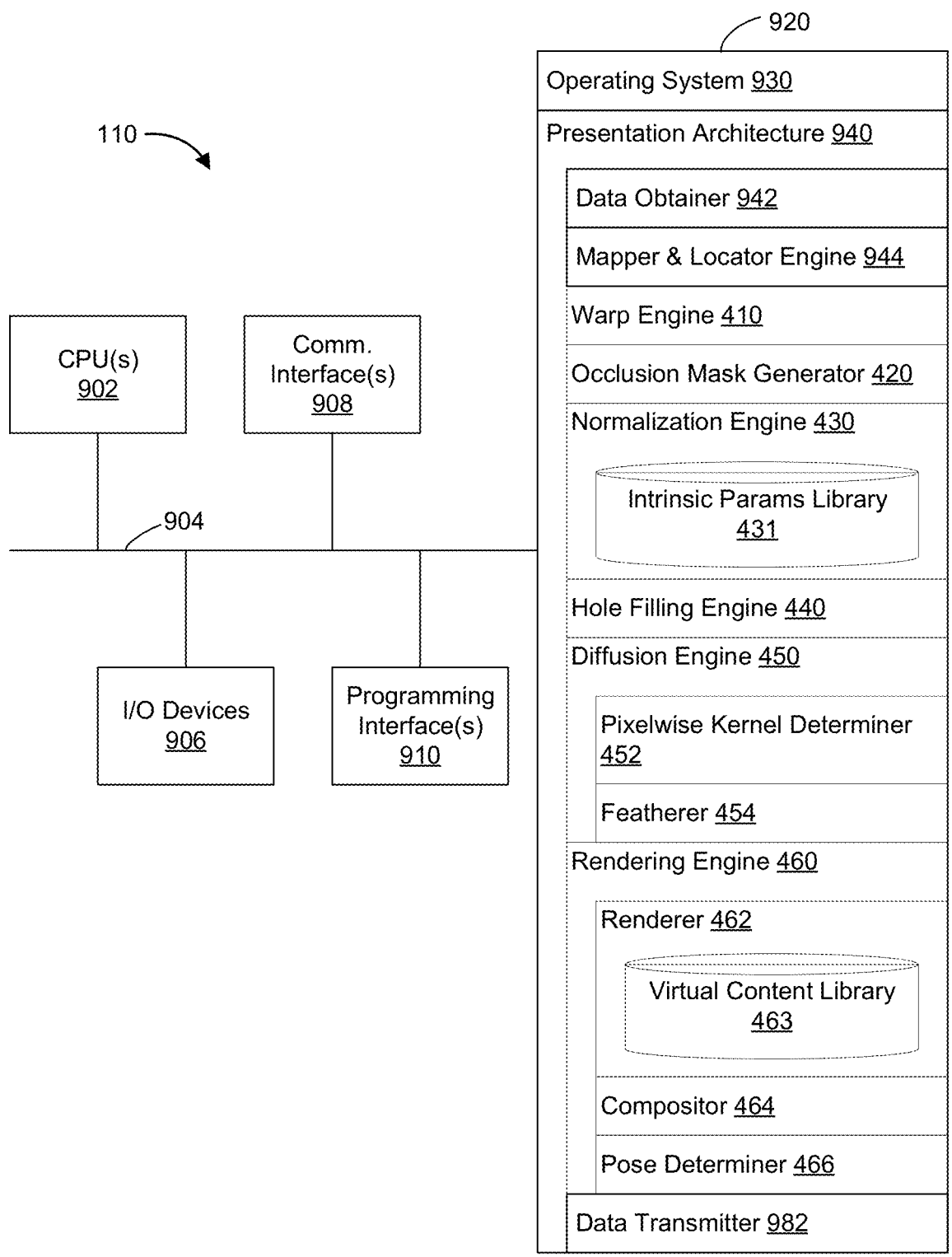
FIG. 9 is a block diagram of an example controller in accordance with some implementations.

FIG. 9 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 902 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 906, one or more communication interfaces 908 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 910, a memory 920, and one or more communication buses 904 for interconnecting these and various other components.

In some implementations, the one or more communication buses 904 include circuitry that interconnects and controls communications between system components. In some implementations, the one or more I/O devices 906 include at least one of a keyboard, a mouse, a touchpad, a touch-screen, a joystick, one or more microphones, one or more speakers, one or more image sensors, one or more displays, and/or the like.

The memory 920 includes high-speed random-access memory, such as dynamic random-access memory (DRAM), static random-access memory (SRAM), double-data-rate random-access memory (DDR RAM), or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930 and a presentation architecture 940.

The operating system 930 includes procedures for handling various basic system services and for performing hardware dependent tasks.

In some implementations, the presentation architecture 940 is configured to render, present, and modify an XR environment. To that end, in some implementations, the presentation architecture 940 includes a data obtainer 942, a mapper and locator engine 944, the warp engine 410, the occlusion mask generator 420, the normalization engine 430, the hole filling engine 440, the diffusion engine 450, a rendering engine 460, a data transmitter 982.

In some implementations, the data obtainer 942 is configured to obtain data (e.g., captured image frames of the physical environment 105, presentation data, input data, user interaction data, camera pose tracking information, eye tracking information, head/body pose tracking information, hand/limb tracking information, sensor data, location data, etc.) from at least one of the I/O devices 906 of the controller 110, the electronic device 120, and the optional remote input devices. To that end, in various implementations, the data obtainer 942 includes instructions and/or logic therefor, and heuristics and metadata therefor.

In some implementations, the warp engine 410 is configured to perform a warping operation/technique (e.g., dense depth reprojection or the like) on a first image of an environment from a first image sensor (e.g., the main $MCAM_L$ in FIGS. 3A-3C) associated with first intrinsic parameters to generate a first warped image. For example, the first warped image accounts for the offset/difference between the translational/rotational coordinates of the user's eye (e.g., left eye) and the translational/rotational coordinates of the first image sensor. To that end, in various implementations, the warp engine 410 includes instructions and/or logic therefor, and heuristics and metadata therefor.

In some implementations, the occlusion mask generator 420 is configured to obtain (e.g., receive, retrieve, or determine/generate) an occlusion mask based on the first warped image that indicates holes in the first warped image. For example, an occlusion mask generation process is described above in more detail with reference to FIG. 5. To that end, in various implementations, the occlusion mask generator 420 includes instructions and/or logic therefor, and heuristics and metadata therefor.

In some implementations, the normalization engine 430 is configured to normalize a second image of the environment from a second image sensor associated with second intrinsic parameters based on a difference between the first and second intrinsic parameters to produce a normalized second image. In some implementations, the normalization engine 430 is also configured to normalize images of the environment from other image sensors (e.g., the SCAMs 330 and 340, and the DCAMs 350 and 360 in FIGS. 3A-3C). To that end, in various implementations, the normalization engine 430 includes instructions and/or logic therefor, and heuristics and metadata therefor.

In some implementations, the intrinsic parameters library 431 includes the intrinsic parameters for the various image sensors. In some implementations, the intrinsic parameters library 431 is stored locally and/or remotely. In some implementations, the intrinsic parameters library 431 is pre-populated or populated on-the-fly by polling the various image sensors. For example, the intrinsic parameters library 431 is described above in more detail with reference to FIG. 3C.

In some implementations, the hole filling engine 440 is configured to fill a first set of one or more holes of the occlusion mask based on the normalized second image to produce a modified first image. In some implementations, the hole filling engine 440 is also configured to fill additional holes of the occlusion mask based on other normalized images associated with other image sensors (e.g., the SCAMs 330 and 340, and the DCAMs 350 and 360 in FIGS. 3A-3C). To that end, in various implementations, the hole filling engine 440 includes instructions and/or logic therefor, and heuristics and metadata therefor.

In some implementations, the diffusion engine 450 is configured to perform a pixelwise diffusion process on the modified first image using a diffusion kernel to fill a second set of one or more holes of the occlusion mask. To that end, in various implementations, the diffusion engine 450 includes instructions and/or logic therefor, and heuristics and metadata therefor. In some implementations, the diffusion engine 450 includes the pixelwise kernel determiner 452 and the featherer 454.

In some implementations, the pixelwise kernel determiner 452 is configured to obtain (e.g., receive, retrieve, or determine/generate) the diffusion kernel based on the depth of a subject pixel. In some implementations, the pixelwise kernel determiner 452 is configured to obtain (e.g., receive, retrieve, or determine/generate) the diffusion kernel based on a determination as to whether a subject pixel is within a focus region, wherein the focus region is determined based at least in part on a gaze direction. To that end, in various implementations, the pixelwise kernel determiner 452 includes instructions and/or logic therefor, and heuristics and metadata therefor.

In some implementations, the featherer 454 is configured to perform a feathering operation on pixels associated with the pixelwise diffusion process in order to smooth discontinuities therein. To that end, in various implementations, the featherer 454 includes instructions and/or logic therefor, and heuristics and metadata therefor.

In some implementations, the rendering engine 460 is configured to render the XR environment. To that end, in various implementations, the rendering engine 460 includes instructions and/or logic therefor, and heuristics and metadata therefor. In some implementations, the rendering engine 460 includes the renderer 462, the compositor 464, and the camera pose determiner 466.

In some implementations, the renderer 462 is configured to render XR content from the virtual content library 463 according to a current camera pose relative thereto. To that end, in various implementations, the renderer 462 includes instructions and/or logic therefor, and heuristics and metadata therefor.

In some implementations, the virtual content library 463 includes a plurality of XR object, items, scenery, and/or the like. In some implementations, the virtual content library 463 is stored locally and/or remotely. In some implementations, the virtual content library 463 is pre-populated.

In some implementations, the compositor 464 is configured to composite the rendered XR content with the modified first image. In some implementations, the compositor 464 obtains (e.g., receives, retrieves, determines/generates, or otherwise accesses) depth information (e.g., a point cloud, depth mesh, or the like) associated with the scene (e.g., the physical environment 105 in FIG. 1) to maintain z-order between the rendered XR content and physical objects in the physical environment. To that end, in various implementations, the compositor 464 includes instructions and/or logic therefor, and heuristics and metadata therefor.

In some implementations, the camera pose determiner 466 is configured to determine a current camera pose of the electronic device 120 and/or the user 150 relative to the XR content. To that end, in various implementations, the camera pose determiner 466 includes instructions and/or logic therefor, and heuristics and metadata therefor.

In some implementations, the data transmitter 982 is configured to transmit data (e.g., presentation data such as rendered image frames associated with the XR environment, location data, etc.) to at least the electronic device 120. To that end, in various implementations, the data transmitter 982 includes instructions and/or logic therefor, and heuristics and metadata therefor.

Although the data obtainer 942, the mapper and locator engine 944, the warp engine 410, the occlusion mask generator 420, the normalization engine 430, the hole filling engine 440, the diffusion engine 450, the rendering engine 460, the data transmitter 982 are shown as residing on a single device (e.g., the controller 110), it should be understood that in other implementations, any combination of the data obtainer 942, the mapper and locator engine 944, the warp engine 410, the occlusion mask generator 420, the normalization engine 430, the hole filling engine 440, the diffusion engine 450, the rendering engine 460, the data transmitter 982 may be located in separate computing devices.

In some implementations, the functions and/or components of the controller 110 are combined with or provided by the electronic device 120 shown below in FIG. 10. Moreover, FIG. 9 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 10:
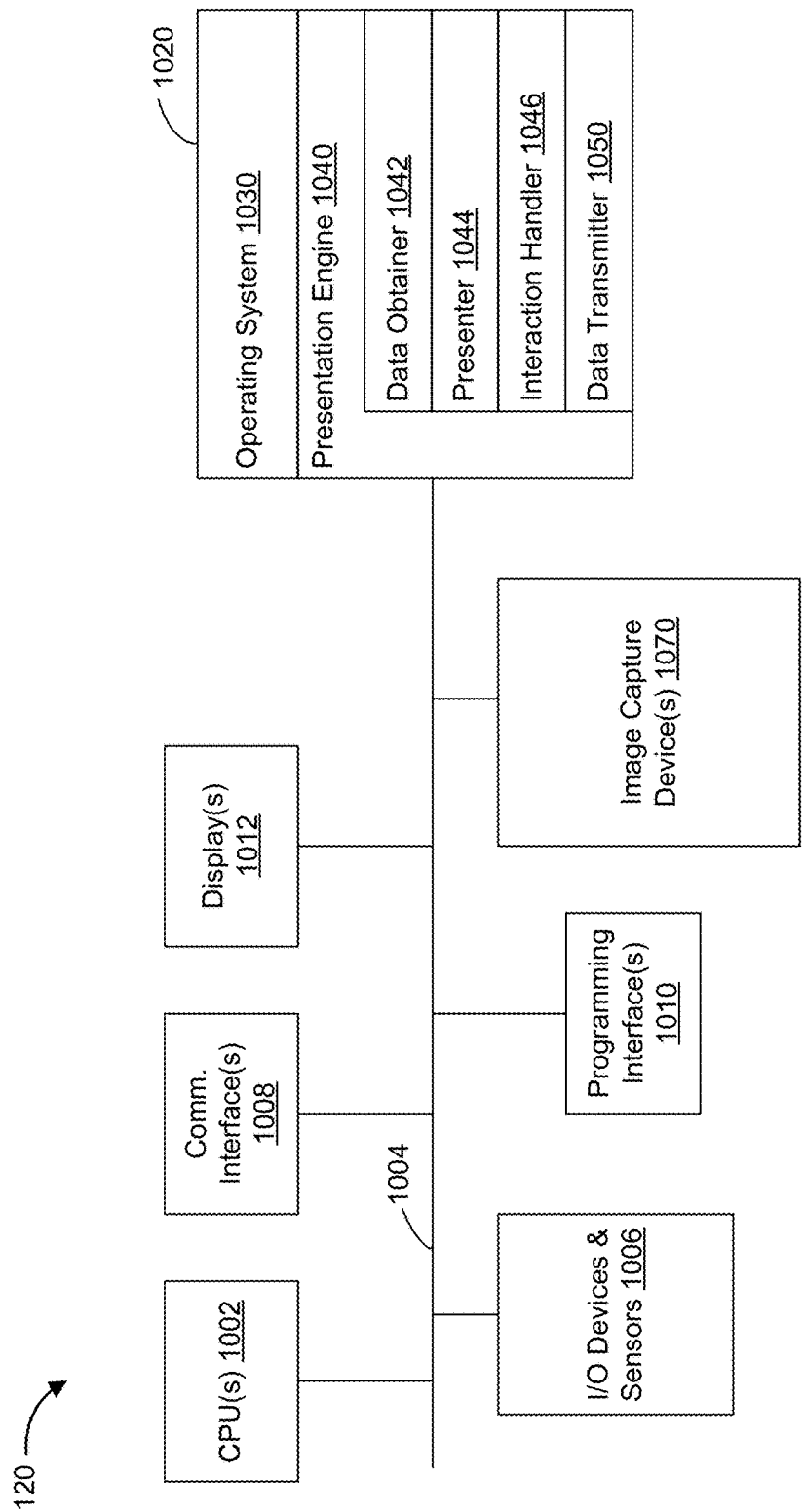
FIG. 10 is a block diagram of an example electronic device in accordance with some implementations.

FIG. 10 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1010, one or more displays 1012, an image capture device 1070 (e.g., one or more optional interior- and/or exterior-facing image sensors), a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), a localization and mapping engine, an eye tracking engine, a body/head pose tracking engine, a hand/limb tracking engine, a camera pose tracking engine, and/or the like.

In some implementations, the one or more displays 1012 are configured to present the XR environment to the user. In some implementations, the one or more displays 1012 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 1012 correspond to touchscreen displays. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 1012 correspond to diffractive, reflective, polarized, holographic, etc. waveguide displays. For example, the electronic device 120 includes a single display. In another example, the electronic device 120 includes a display for each eye of the user. In some implementations, the one or more displays 1012 are capable of presenting AR and VR content. In some implementations, the one or more displays 1012 are capable of presenting AR or VR content.

In some implementations, the image capture device 1070 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 1070 includes a lens assembly, a photodiode, and a front-end architecture. In some implementations, the electronic device 120 corresponds to the near-eye system 305 in FIG. 3A described in more detail above. In turn, the image capture device 1070 includes a plurality of image sensors such as the left main (forward-facing) camera 310 (e.g., $MCAM_L$), the right (forward-facing) main camera 320 (e.g., $MCAM_R$), the left side-facing (peripheral) camera 330 (e.g., $SCAM_L$), the right side-facing (peripheral) camera 340 (e.g., $SCAM_R$), the left downward-facing camera 350 (e.g., $DCAM_L$), and the right downward-facing camera 360 (e.g., $DCAM_R$).

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. In some implementations, the memory 1020 or the non-transitory computer readable storage medium of the memory 1020 stores the following programs, modules and data structures, or a subset thereof including an optional operating system 1030 and a presentation engine 1040.

The operating system 1030 includes procedures for handling various basic system services and for performing hardware dependent tasks. In some implementations, the presentation engine 1040 is configured to present XR content (and/or other content) to the user via the one or more displays 1012. To that end, in various implementations, the presentation engine 1040 includes a data obtainer 1042, a presenter 1044, an interaction handler 1046, and a data transmitter 1050.

In some implementations, the data obtainer 1042 is configured to obtain data (e.g., presentation data such as rendered image frames associated with the XR environment, input data, user interaction data, head tracking information, camera pose tracking information, eye tracking information, sensor data, location data, etc.) from at least one of the I/O devices and sensors 1006 of the electronic device 120, the controller 110, and the remote input devices. To that end, in various implementations, the data obtainer 1042 includes instructions and/or logic therefor, and heuristics and metadata therefor.

In some implementations, the presenter 1044 is configured to present and update XR content (e.g., the rendered image frames associated with the XR environment) via the one or more displays 1012. To that end, in various implementations, the presenter 1044 includes instructions and/or logic therefor, and heuristics and metadata therefor.

In some implementations, the interaction handler 1046 is configured to detect user interactions with the presented XR content. To that end, in various implementations, the interaction handler 1046 includes instructions and/or logic therefor, and heuristics and metadata therefor.

In some implementations, the data transmitter 1050 is configured to transmit data (e.g., presentation data, location data, user interaction data, head tracking information, camera pose tracking information, eye tracking information, etc.) to at least the controller 110. To that end, in various implementations, the data transmitter 1050 includes instructions and/or logic therefor, and heuristics and metadata therefor.

Although the data obtainer 1042, the presenter 1044, the interaction handler 1046, and the data transmitter 1050 are shown as residing on a single device (e.g., the electronic device 120), it should be understood that in other implementations, any combination of the data obtainer 1042, the presenter 1044, the interaction handler 1046, and the data transmitter 1050 may be located in separate computing devices.

Moreover, FIG. 10 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
obtaining a first image of an environment from a first image sensor communicatively coupled to a computing system with non-transitory memory and one or more processors, wherein the first image sensor is associated with first intrinsic parameters;
performing a warping operation on the first image according to perspective offset values to generate a warped first image in order to account for perspective differences between the first image sensor and a user of the computing system;

determining an occlusion mask based on the warped first image that includes a plurality of holes;

obtaining a second image of the environment from a second image sensor communicatively coupled to the computing system, wherein the second image sensor is associated with second intrinsic parameters;

normalizing the second image based on a difference between the first and second intrinsic parameters to produce a normalized second image; and filling a first set of one or more holes of the occlusion mask based on the normalized second image to produce a modified first image.

2. The method of claim 1, further comprising:
performing a pixelwise diffusion process on the modified first image using a diffusion kernel to fill a second set of one or more holes of the occlusion mask.

3. The method of claim 2, wherein the diffusion kernel is based at least in part on depth of a subject pixel.

4. The method of claim 2, further comprising:
determining a focus region based on a gaze direction of the user of the computing system, and wherein the diffusion kernel is based at least in part on whether a subject pixel is within the focus region.

5. The method of claim 2, further comprising:
performing a feathering operation on pixels associated with the pixelwise diffusion process in order to smooth discontinuities.

6. The method of claim 1, wherein normalizing the second image corresponds to one of: linear up-sampling using a guided or joint bilateral filter, or linear down-sampling using the guided or joint bilateral filter.

7. The method of claim 1, further comprising:
determining a plurality of pixels in the first image that will be covered by virtual content; and foregoing filling holes associated with the plurality of pixels.

8. The method of claim 1, wherein the occlusion mask is determined based at least in part on a first set of depth values relative to a first perspective associated with the first image sensor and a second set of depth values relative to a second perspective associated with the second image sensor different from the first perspective.

9. The method of claim 1, wherein the occlusion mask is determined based at least in part on a first set of depth values relative to a first perspective associated with the first image sensor or a second set of depth values relative to a second perspective associated with the second image sensor different from the first perspective.

10. The method of claim 1, wherein the first intrinsic parameters include a first resolution, a first field-of-view (FOV), a first frame rate, a first frame delay, and a first color space, and wherein the second intrinsic parameters include a second resolution, a second FOV, a second frame rate, a second frame delay, and a second color space.

11. The method of claim 10, wherein the first and second intrinsic parameters include at least one similar resolution, FOV, frame rate, frame delay, or color space.

12. The method of claim 10, wherein the first and second intrinsic parameters include mutually exclusive resolutions, FOVs, frame rates, frame delays, and color spaces.

13. The method of claim 1, wherein the warping operation corresponds to a dense depth reprojection algorithm.

14. The method of claim 1, wherein the first intrinsic parameters for the first image sensor include a first resolution and a first color space, and wherein the second intrinsic parameters for the second image sensor include a second resolution different from the first resolution and a second color space different from the first color space.

15. The method of claim 14, wherein the computing system further includes a third image sensor associated with third intrinsic parameters, wherein the third intrinsic parameters for the third image sensor include a third resolution different from the first resolution and a second color space different from the first color space.

16. The method of claim 1, wherein the computing system corresponds to a near-eye system that further includes a display device.

17. A computing system comprising:
an interface for communicating with first and second image sensors;
one or more processors;
a non-transitory memory; and
one or more programs stored in the non-transitory memory, which, when executed by the one or more processors, cause the computing system to:
obtain a first image of an environment from the first image sensor, wherein the first image sensor is associated with first intrinsic parameters;
perform a warping operation on the first image according to perspective offset values to generate a warped first image in order to account for perspective differences between the first image sensor and a user of the computing system;
determine an occlusion mask based on the warped first image that includes a plurality of holes;
obtain a second image of the environment from the second image sensor, wherein the second image sensor is associated with second intrinsic parameters;
normalize the second image based on a difference between the first and second intrinsic parameters to produce a normalized second image; and
fill a first set of one or more holes of the occlusion mask based on the normalized second image to produce a modified first image.

18. The computing system of claim 17, wherein the one or more programs further cause the computing system to:
perform a pixelwise diffusion process on the modified first image using a diffusion kernel to fill a second set of one or more holes of the occlusion mask.

19. The computing system of claim 18, wherein the diffusion kernel is based at least in part on depth of a subject pixel.

20. The computing system of claim 18, wherein the one or more programs further cause the computing system to:
determine a focus region based on a gaze direction of the user of the computing system, and wherein the diffusion kernel is based at least in part on whether a subject pixel is within the focus region.

21. The computing system of claim 18, wherein the one or more programs further cause the computing system to:
perform a feathering operation on pixels associated with the pixelwise diffusion process in order to smooth discontinuities.

22. A non-transitory memory storing one or more programs, which, when executed by one or more processors of a computing system with an interface for communicating with first and second image sensors, cause the computing system to:
obtain a first image of an environment from the first image sensor, wherein the first image sensor is associated with first intrinsic parameters;
perform a warping operation on the first image according to perspective offset values to generate a warped first image in order to account for perspective differences between the first image sensor and a user of the computing system;

determine an occlusion mask based on the warped first image that includes a plurality of holes;

obtain a second image of the environment from the second image sensor, wherein the second image sensor is associated with second intrinsic parameters;

normalize the second image based on a difference between the first and second intrinsic parameters to produce a normalized second image; and fill a first set of one or more holes of the occlusion mask based on the normalized second image to produce a modified first image.

23. The non-transitory memory of claim 22, wherein the one or more programs further cause the computing system to:

perform a pixelwise diffusion process on the modified first image using a diffusion kernel to fill a second set of one or more holes of the occlusion mask.

24. The non-transitory memory of claim 23, wherein the diffusion kernel is based at least in part on depth of a subject pixel.

25. The non-transitory memory of claim 23, wherein the one or more programs further cause the computing system to:

determine a focus region based on a gaze direction of the user of the computing system, and wherein the diffusion kernel is based at least in part on whether a subject pixel is within the focus region.

26. The non-transitory memory of claim 23, wherein the one or more programs further cause the computing system to:

perform a feathering operation on pixels associated with the pixelwise diffusion process in order to smooth discontinuities, performing a feathering operation on pixels associated with the pixelwise diffusion process in order to smooth discontinuities.

* * * * *